(12) United States Patent
Maruyama

(10) Patent No.: US 6,364,770 B1
(45) Date of Patent: Apr. 2, 2002

(54) IMAGE CREATING APPARATUS, DISPLAYED SCENE SWITCHING METHOD FOR THE IMAGE CREATING APPARATUS, COMPUTER-READABLE RECORDING MEDIUM CONTAINING DISPLAYED SCENE SWITCHING PROGRAM FOR THE IMAGE CREATING APPARATUS, AND VIDEO GAME MACHINE

(75) Inventor: Osamu Maruyama, Higashiosaka (JP)

(73) Assignee: Konami Co., Ltd., Kobe (JP)

( * ) Notice: Subject to any disclaimer, the term of this patent is extended or adjusted under 35 U.S.C. 154(b) by 0 days.

(21) Appl. No.: 09/412,053

(22) Filed: Oct. 4, 1999

(30) Foreign Application Priority Data

Oct. 8, 1998 (JP) .......................................... 10-287127

(51) Int. Cl.$^7$ ............................................. G06F 17/00
(52) U.S. Cl. ............................ 463/31; 345/629; 463/43
(58) Field of Search ........................ 463/1, 7, 8, 31–33, 463/43; 345/113, 114, 115, 435, 511, 629, 634, 636–639, 641, 646, 530, 531, 536, 537, 539, 540, 544, 545, 547, 112, 118, 121, 122, 123, 418, 419, 422, 619, 630, 631, 642

(56) References Cited

U.S. PATENT DOCUMENTS

| | | | | |
|---|---|---|---|---|
| 4,360,831 A | * | 11/1982 | Keller | .......................... 358/182 |
| 4,951,229 A | * | 8/1990 | Dinicola et al. | ............. 364/521 |
| 5,483,257 A | | 1/1996 | Otake et al. | |
| 5,572,691 A | * | 11/1996 | Koudmani | ................... 395/405 |
| 5,708,457 A | | 1/1998 | Otake et al. | |
| 5,838,334 A | * | 11/1998 | Dye | ........................... 345/503 |
| 6,043,829 A | * | 3/2000 | Inoue | .......................... 345/519 |
| 6,075,543 A | * | 6/2000 | Akeley | ......................... 345/508 |
| 6,078,305 A | * | 6/2000 | Mizutani | ..................... 345/113 |
| 6,091,428 A | * | 7/2000 | Piazza et al. | ................ 345/509 |

FOREIGN PATENT DOCUMENTS

| | | |
|---|---|---|
| EP | 07230558 | 8/1995 |
| JP | 3-191395 | 8/1991 |
| JP | 4-211295 | 8/1992 |
| WO | WO9625211 | 8/1996 |

* cited by examiner

Primary Examiner—Mark Sager
Assistant Examiner—Steven Ashburn
(74) Attorney, Agent, or Firm—Jordan and Hamburg LLP

(57) ABSTRACT

An image creating apparatus selectively displays a plurality of scenes on a display unit. The image creating apparatus includes an image-data storage unit including at least three data storage areas in each of which image data of one frame on the display unit are stored, a picture-signal processing unit for generating the image data of one frame and for cyclically storing the generated data in the data storage areas, an image output unit for cyclically reading and successively outputting the image data stored in the data storage areas, a switching-designation unit for outputting a signal for designating the switching of each scene displayed on the display unit, and a processing-control unit for switching the scene being displayed on the display unit from an old scene to a new scene when the switching-designation signal is output. The processing-control unit includes an old-scene holding unit for holding the image data of the old scene in any one of the data storage areas in the image-data storage unit, and an instruction-controlling unit for controlling the picture-signal processing unit to use the images of the old and new scenes to generate image data and to cyclically store the generated image data in the other data storage areas.

13 Claims, 17 Drawing Sheets

IMAGE CREATING APPARATUS, DISPLAYED SCENE SWITCHING METHOD FOR THE IMAGE CREATING APPARATUS, COMPUTER-READABLE RECORDING MEDIUM CONTAINING DISPLAYED SCENE SWITCHING PROGRAM FOR THE IMAGE CREATING APPARATUS, AND VIDEO GAME MACHINE

BACKGROUND OF THE INVENTION

1. Field of the Invention

The present invention relates to an image creating apparatus for generating images to be displayed on a display unit, a displayed scene switching method for the image creating apparatus, a computer-readable recording medium containing a displayed scene switching program for the image creating apparatus, and a video game machine.

2. Description of the Related Art

Many game systems have been proposed as display systems for displaying an image on a display unit, such as a system comprised of a home-use game console and a television monitor, a commercial-use game machine, and a system comprised of a personal computer or work station, a display, and a sound output device.

The game systems each include a player-operated controller, a recording medium containing game-program data, a central processing unit (CPU) for performing control for the generation of sound and images based on the game-program data, a processor for generating images, a processor for generating sound, a monitor for displaying images, and a speaker for outputting the generated sound. In many cases, the types of recording medium include a compact-disk read-only memory (CD-ROM), a semiconductor memory, and a cassette having a built-in semiconductor memory.

In the display systems, it is common that a plurality of scenes are displayed on the display unit.

The display systems switch displayed scenes while displaying images. It is expected that the displayed scenes are preferably switched.

SUMMARY OF THE INVENTION

Accordingly, it is an object of the present invention to provide an image creating apparatus for preferably switching displayed scenes while displaying images, a displayed scene switching method for the image creating apparatus, a computer-readable recording medium containing a displayed scene switching program for the image creating apparatus, and a video game machine.

To this end, according to an aspect of the present invention, the foregoing object is achieved through provision of an image creating apparatus for selectively displaying a plurality of scenes on a display unit. The image creating apparatus includes an image-data storage unit including at least three data storage areas in each of which image data of one frame on the display unit are stored, a picture-signal processing unit for generating the image data of one frame and for cyclically storing the generated data in the data storage areas, an image output unit for cyclically reading and successively outputting the image data stored in the data storage areas on the display unit, a switching-designation unit for outputting a signal for designating the switching of each scene displayed on the display unit, and a processing-control unit for switching the scene being displayed on the display unit from an old scene to a new scene when the switching-designation signal is output. The processing-control unit includes an old-scene holding unit for holding the image data of the old scene in any one of the data storage areas in the image-data storage unit, and an instruction-controlling unit for controlling the picture-signal processing unit to use the images of the old and new scenes to generate image data and to cyclically store the generated image data in the other data storage areas.

Preferably, the picture-signal processing unit generates, as the image data, the data of an image viewed from a predetermined viewpoint in a virtual three-dimensional space, and the instruction-controlling unit controls the picture-signal processing unit to generate the image data in a form set so that the image of the old scene has higher or lower priority of display to the image of the new scene and to cyclically store the generated data in the other data storage areas in the image-data storage unit.

The instruction-controlling unit may control the picture-signal processing unit to divide the image of the old scene into a plurality of portions and to generate the image data in a form set so that the portions of the image of the old scene are separated from one another whenever the image data are cyclically stored in the other data storage areas.

The processing-control unit may include a transparency-setting unit which successively changes the degree of transparency of either the image of the old scene or the image of the new scene so that the image of the new scene is displayed in accordance with an elapse of time and which controls the picture-signal processing unit to generate the image data with the changed degree of transparency.

The instruction-controlling unit may control the picture-signal processing unit to generate the image data in a form set so that the image of the old scene has higher priority of display to the image of the new scene, and the transparency-setting unit may successively increase the degree of transparency of the image of the old scene.

The image creating apparatus may further include a switching-terminating unit for terminating the operation of the processing-control unit when the degree of transparency of the image of the old scene reaches a predetermined value.

The old-image holding unit may hold, in a predetermined data storage area as one of the data storage areas in the image-data storage unit, the image data stored in the predetermined data storage area after the switching-designation signal is output.

The image-data storage unit may include first, second, and third data storage areas as the plurality of data storage areas.

According to another aspect of the present invention, the foregoing object is achieved through provision of a displayed scene switching method for an image creating apparatus for selectively displaying a plurality of scenes on a display unit. The displayed scene switching method includes the steps of: generating image data of one frame on the display unit before cyclically storing the generated image data in at least three data storage areas of an image-data storage unit which are each capable of storing the image data of one frame; cyclically reading and successively outputting the image data stored in the data storage areas on the display unit; holding, when a signal for designating the switching of each scene displayed on the display unit is output, the image data of an old scene being displayed on the display unit in any one of the data storage areas of the image-data storage unit; and using the images of the old scene and a new scene to be next displayed to generate image data, and cyclically storing the generated image data in the other data storage areas of the image-data storage unit.

According to a further aspect of the present invention, the foregoing object is achieved through provision of a computer-readable recording medium containing a displayed scene switch program for an image creating apparatus that selectively displays a plurality of scenes on a display unit. The displayed scene switch program includes a storage step for generating image data of one frame on the display unit before cyclically storing the generated image data in at least three data storage areas of an image-data storage unit which are each capable of storing the image data of one frame, an output step for cyclically reading and successively outputting the image data stored in the data storage areas on the display unit, a switching-designation step for outputting a signal for designating the switching of each scene displayed on the display unit, a holding step for holding, when the switching-designation signal is output, the image data of an old scene being displayed on the display unit in any one of the data storage areas of the image-data storage unit, and a switching-storage step for using the images of the old scene and a new scene to be next displayed to generate image data and for cyclically storing the generated image data in the other data storage areas of the image-data storage unit.

According to a still further aspect of the present invention, the foregoing object is achieved through provision of a video game machine including a program storage unit containing a game program, an operation unit capable of being externally operated, and an image creating apparatus for selectively displaying a plurality of scenes on a display unit. The image creating apparatus includes an image-data storage unit including at least three data storage areas in each of which image data of one frame on the display unit are stored, a picture-signal processing unit for generating the image data of one frame and for cyclically storing the generated data in the data storage areas, an image output unit for cyclically reading and successively outputting the image data stored in the data storage areas on the display unit, a switching-designation unit for outputting a signal for designating the switching of each scene displayed on the display unit, and a processing-control unit for switching the scene being displayed on the display unit from an old scene to a new scene when the switching-designation signal is output. The processing-control unit includes an old-scene holding unit for holding the image data of the old scene in any one of the data storage areas in the image-data storage unit, and an instruction-controlling unit for controlling the picture-signal processing unit to use the images of the old and new scenes to generate image data and to cyclically store the generated image data in the other data storage areas.

According to the present invention, when a switching-designation signal is output, the image data of an old scene being displayed on a display unit is held in one data storage area in an image-data storage unit, and the image of the old scene and the image of a new scene are used to generate image data, while the generated image data are cyclically stored in the other data storage areas, whereby the data of an image in which the image of the old scene and the image of the new scene are mixed are generated, which can gradually change the image displayed on the display unit from the image of the old scene to the image of the new scene.

By holding the image data of an old scene in one data storage area, and storing, in the other data storage areas, image data including the image of a new scene, the need for using an additional data storage area for the image data of the old scene can be eliminated.

By cyclically storing, in the other data storage areas of an image-data storage unit, image data including the image of the new scene, a moving picture as the new scene can be displayed. Accordingly, the scene displayed on a display unit can be preferably switched from the old scene to the new scene.

According to the present invention, by holding, when a switching-designation signal is output, the image data of an old scene being displayed on a display unit in one data storage area of an image-data storage unit, and generating image data in a form set so that the image of the old scene has higher or lower priority of display to the image of a new scene, an image in which the image of an old scene and the image of a new scene are covered with each other is obtained, which enables preferable switching frog the old scene to the new scene.

According to the present invention, by generating image data in a form set so that a plurality of divided portions of the image of an old scene are separated from one another for each cyclical storing to the other data storage areas, the image of a new scene is gradually displayed in accordance with the separation of the divided portions of the image of the old scene, which enables preferable switching from the image of the old scene to the image of the new scene.

According to the present invention, the degree of transparency of either the image of an old scene or the image of a new scene is successively changed for displaying the image of a new scene on a display unit with an elapse of time, and the changed degree of transparency is used to generate image data, whereby the image of the new scene can be gradually displayed with an elapse of time from a state in which the image of the old scene is displayed. This can preferably change the scene displayed on the display unit from the old scene to the new scene.

According to the present invention, by generating image data in a form in which the image of an old scene has higher priority of display to the image of a new scene, and successively increasing the degree of the image of the old scene, the image of the new scene can be gradually displayed on a display unit in accordance with an increase in the degree of its transparency, compared with the image of the old scene.

According to the present invention, when the degree of transparency of the image of an old scene reaches a predetermined value, the operation of a processing-control unit is terminated, whereby the holding of the image of the old scene is terminated to return a state obtained before a switching-designation signal is output. Thereby, displayed scene switching from the old scene to the new scene is preferably performed, and the image of the new scene can be displayed on the display unit.

According to the present invention, after a switching-designation signal is output, image data stored in a predetermined data storage area of an image-data storage unit by a picture-signal processing unit are held in the predetermined data storage area, whereby the same data storage area is always used to hold the image data of the old scene. This makes it possible for an instruction-controlling unit to easily instruct the picture-signal processing unit to access the data storage area.

According to the present invention, an image-data storage unit includes three data storage areas: first to third data storage areas, whereby a moving picture as a new scene can be displayed while the image of an old scene and the image of the new scene are being displayed with both images covered by each other, which enables preferable scene switching.

According to the present invention, when a switching-designation signal is output, the image data of an old scene being displayed on the display unit is held in one data storage area in an image-data storage unit, and the image of the old scene and the image of a new scene are used to generate image data, while the generated image data are cyclically stored in the other data storage areas. Therefore, the data of an image in which the image of the old scene and the image of the new scene are mixed are generated, which can gradually change the game screen displayed on the display unit from the image of the old scene to the image of the new scene.

In addition, by holding the image data of the old scene in one data storage area, and storing the image data including the image of the new scene in the other data storage areas, the need for using an additional data storage area for storing the image data of the old scene can be eliminated.

Also, by cyclically storing the image data including the image of the new scene in the other data storage areas of the image-data storage unit, a moving picture as the new scene can be displayed, which can preferably initiate the display of a game screen of the new scene. Therefore, preferable scene switching of the game screen displayed on the display unit can be performed.

According to the present invention, it is determined whether a predetermined clearing condition for an old scene has been satisfied by operating the operation unit, and the satisfaction of the clearing condition outputs a switching-designation signal. Thus, scene switching from the old scene to a new scene is not performed unless the clearing condition has been satisfied, which enables preferable control of displaying the new scene.

According to the present invention, by detecting the contents of operations using an operation unit, creating, in accordance with the detected contents, rendering commands for generating image data every predetermined period in units of screens, and generating image data from the rendering commands so that the creation of the rendering commands is preferably performed, the desired image data can be preferably created.

DESCRIPTION OF THE PREFERRED EMBODIMENTS

Figure 1:
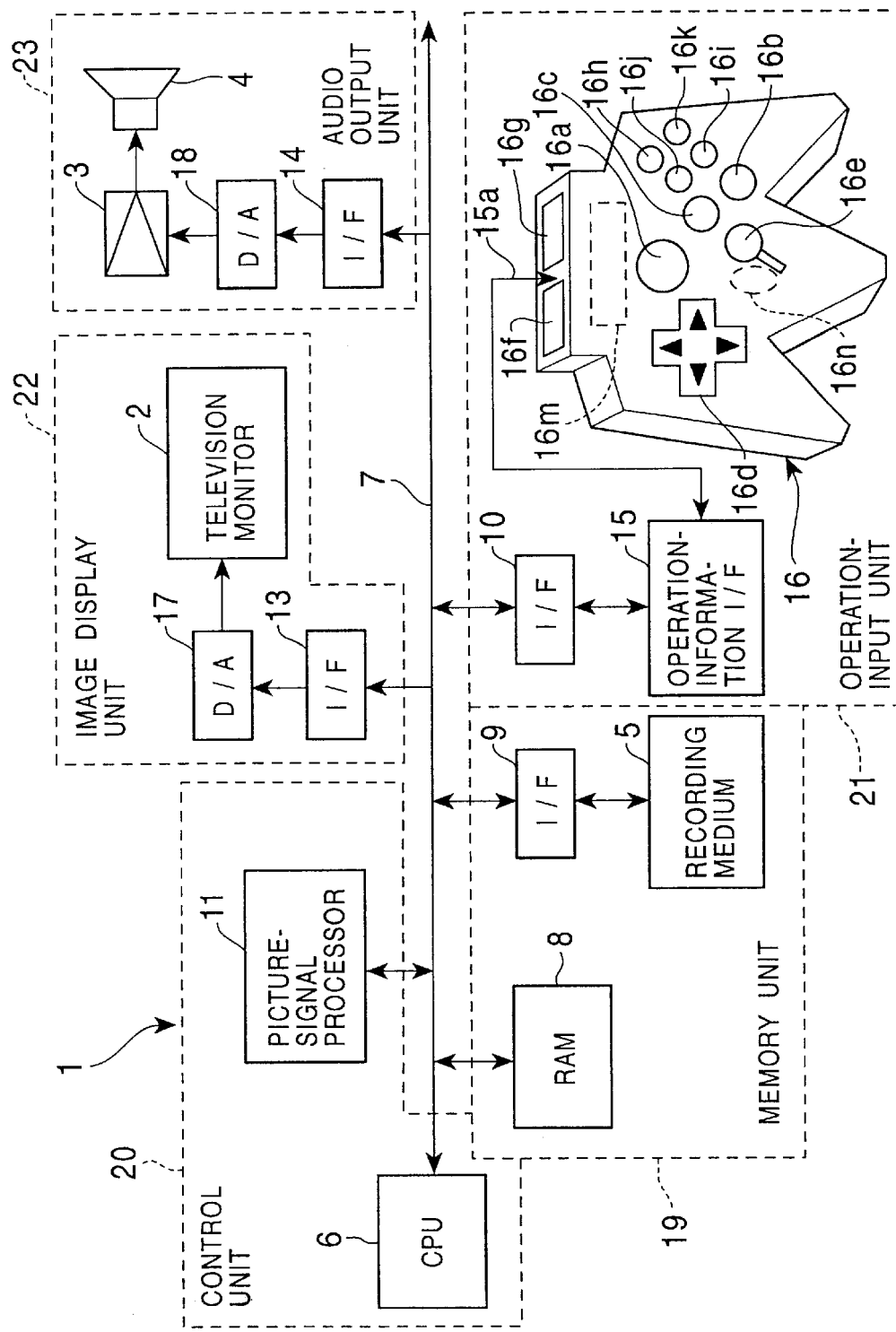
FIG. 1 is a block diagram showing a game system according to an embodiment of the present invention.

FIG. 1 shows the structure of a game system 1 according to an embodiment of the present invention.

The game system 1 includes a game machine, a television monitor 2 as a game-screen display unit for displaying game screens, an amplifying circuit 3 and a speaker 4 for outputting game sound, and a recording medium 5 containing game data composed of images, sound, and program data. The recording medium 5 is, for example, a so-called "read-only memory (ROM) cassette" in which a ROM, or the like, storing the game data and operating-system program data is accommodated in a plastic case, an optical disk, or a flexible disk.

In the game machine, a bus 7 including an address bus, a data bus, and a control bus, is connected to a CPU 6. A random-access memory 8, an interface (I/F) circuit 9, an I/F circuit 10, a picture-signal processor 11, an image processor 12, an I/F circuit 13, and an I/F circuit 14 are connected to the bus 7. A controller 16 is connected to the I/F circuit 10 via an operation-information I/F 15. A digital-to-analog (A/D) converter 17 is connected to the I/F circuit 13, and a digital-to-analog (D/A) converter 18 is connected to the I/F circuit 14.

The RAM 8, the I/F circuit 9, and the recording medium 5 constitute a memory unit 19. The CPU 6 and the picture-signal processor 11 constitute a control unit 20. The I/F circuit 10, the operation-information I/F circuit 15, and the controller 16 constitute an operation-input unit 21. The monitor 2, the I/F circuit 13, and the D/A converter 17 constitute an image display unit 22. The amplifying circuit 3, the speaker 4, the I/F circuit 14, and the D/A converter 18 constitute an audio output unit 23.

The CPU 6 mainly performs computation on a three-dimensional space, computation for converting a position in a three-dimensional space into a position in a virtual three-dimensional space, illumination computation, and the generation and processing of audio data. The signal processor 11 also detects the contents of operations using the controller 16, and generates and stores rendering commands based on the results of computation and the results of detection in the RAM 8.

The picture-signal processor 11 performs a process for writing image data to be rendered on the monitor 2 in the RAM 8, such as the writing of texture data in an area of the RAM 8, which is designated by polygons. The functions and operations of the CPU 6 and the picture-signal processor 11 are described below.

The controller 16 has, as externally operable units, a start button 16a, an A-button 16b, a B-button 16c, a cross key 16d, a stick control unit 16e, a left-trigger button 16f, a right-trigger button 16g, a C1-button 16h, a C2-button 16i, a C3-button 16j, a C4-button 16k, and a distance-change button 16n. The controller 16 sends, to the CPU 6, an operation signal in accordance with the operation of each button.

The stick control unit 16e is almost identical to a joystick in structure. The stick control unit 16e includes an upright stick that can be inclined around a predetermined position of the stick as a fulcrum in the directions of 360 degrees including the front, back, right, and left sides. In accordance with the inclined direction of the stick and an angle of inclination, an X coordinate in the right and left directions and a Y coordinate in the front and back directions, obtained when the upright position is used as an origin, are sent to the CPU 6 via the I/F circuits 15 and 10.

The controller 16 includes a connector 16m to which, for example, a memory card for temporarily storing the progress of the game can be removably mounted.

The form of the game system differs depending on its purpose.

In other words, in the case where the game system is intended for home use, the monitor 2, the amplifying circuit 3, and the speaker 4 are provided separately from the game machine. In the case where the game system is intended for commercial use, all the components shown in FIG. 1 are integrated in a casing.

In the case where the game system 1 has a personal computer or workstation as a core, the monitor 2 corresponds to a display for the computer or workstation, the image processor 12 corresponds to part of the game program recorded on the recording medium 5, or the hardware of an add-in board mounted in an add-in slot of the computer or workstation, and the I/F circuits 9, 10, 13, and 14, the D/A converters 17 and 18, and the operation-information interface 15, correspond to the hardware of an add-in board mounted in an add-in slot of the computer or workstation. The RAM 8 corresponds to the areas of the main or expansion storage of the computer or workstation.

This embodiment shows the case where the game system 1 is intended for home use.

The operation of the game system 1 is briefly described below.

By turning on the main power switch (not shown) to supply power to the game system 1, the CPU 6 reads, based on the operating system recorded on the recording medium 5, images, sound, and game-program data from the recording medium 5. All or part of the read images, sound, and game-program data, are stored in the RAM 8.

Thereafter, the CPU 6 advances the game, based on the game-program data stored in the RAM 8 and on instructions designated from the controller 16 by the game player. In other words, the CPU 6 creates, based on instructions designated from the controller 16 by the game player, commands for audio output and commands for rendering. At this time, the CPU 6 performs, based on the command, computation of a game character position in a three-dimensional space (similar to a two-dimensional space), illumination computation, and the generation and processing of the audio data.

Successively, the picture-signal processor 11 generates and stores image data from the rendering commands in the RAM 8. The D/A converter 17 reads the image data stored in the RAM 8 through the I/F circuit 13 in each predetermined period, and converts the data into analog video signals. The signals are displayed as an image on the screen of the monitor 2.

In addition, audio data output from the CPU 6 are supplied to the D/A converter 13 via the I/F circuit 14, and the data are converted into analog audio signals. The signals are output as sound from the speaker 4 via the amplifying circuit 3.

Figure 2:
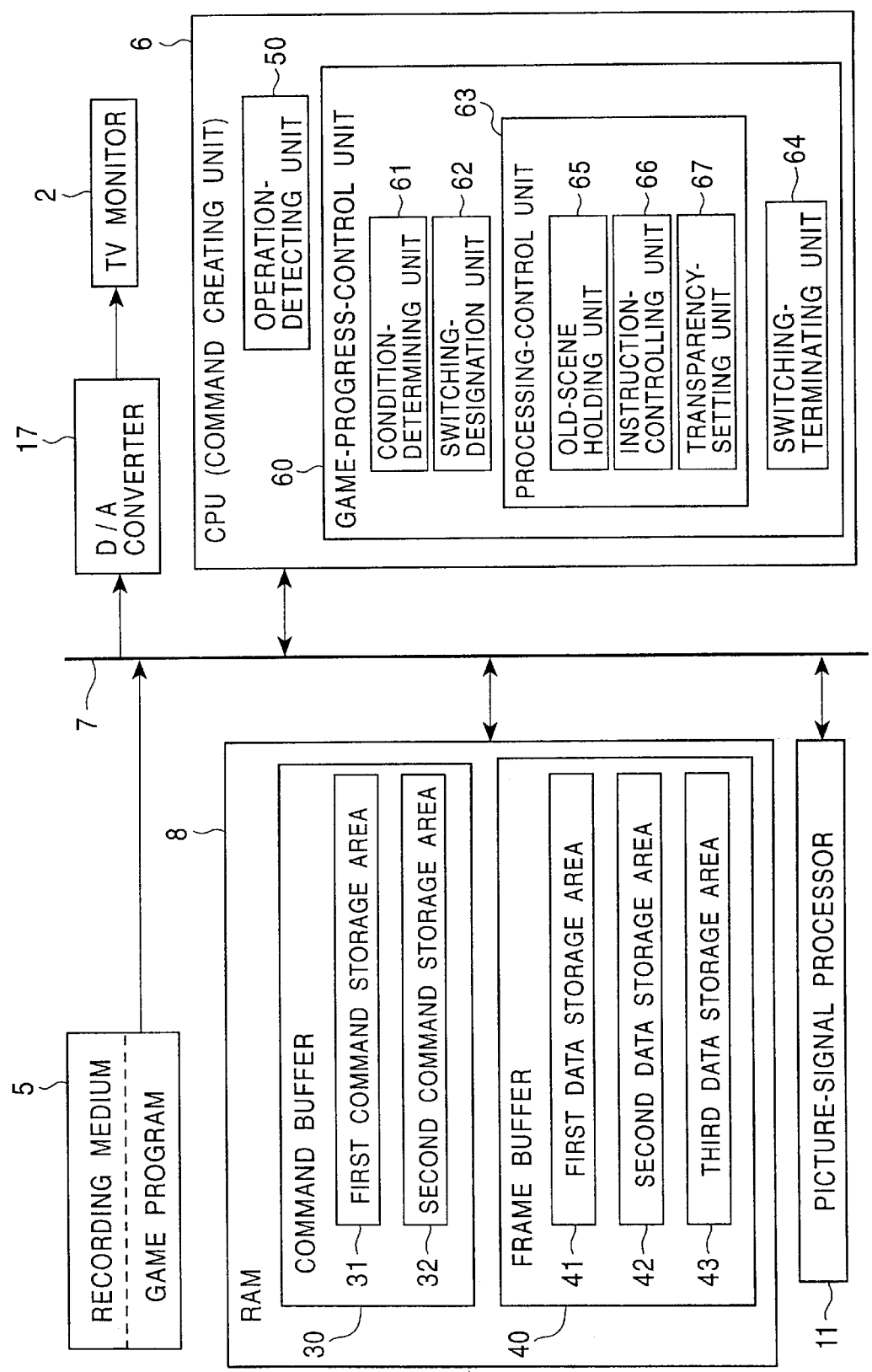
FIG. 2 is a drawing composed of a functional block diagram showing the CPU 6 shown in FIG. 1 and a block diagram showing the main components shown in FIG. 1.

FIG. 2 shows the functional blocks of the CPU 6 and the main components of the game machine 1 shown in FIG. 1.

The RAM 8 includes a command buffer 30 for storing rendering commands, and a frame buffer 40 for storing image data. The command buffer 30 includes a first command storage area 31 and a second command storage area 32. The frame buffer 40 includes first to third data storage areas 41 to 43 each having a storage capacity capable of storing image of one frame.

The CPU 6 has the following functions:
(1) a function as a command creating unit for creating rendering commands for one screen on the monitor 2 in each predetermined period (e.g., ⅟60 of a second in this embodiment) and for alternately storing the created rendering commands in the first and second command storage areas 31 and 32 of the command buffer 30; and
(2) a function for alternately generating image data based on the rendering commands from the first and second command storage areas 31 and 32 and for controlling the picture-signal processor 11 to cyclically store the image data in the first to third storage areas 41 to 43 for performing update, in other words, a function for controlling the picture-signal processor 11 to perform triple buffer control (described below).

With reference to FIG. 2, the operation of displaying an image on the monitor 2 is described below using the timing charts shown in FIGS. 3 and 4.

As described above, the CPU (command creating unit) 6 creates and stores the rendering commands in the command buffer 30. The picture-signal processor 11 uses the rendering commands from the command buffer 30 to create the image data, and stores the image data in the frame buffer 40. The D/A converter 17 converts the image data into analog video signals while scanning the frame buffer 30, and outputs an image on the monitor 2.

The above-described operations by the CPU 6, the picture-signal processor 11, and the D/A converter 17, are executed as timer-interruption operations in each predetermined period (e.g., ⅟60 of a second in this embodiment). For shortening the execution time, the operations by the CPU 6, the picture-signal processor 11, and the D/A converter 17, are executed as simultaneously as possible.

In other that a moving picture may be represented by successively displaying images on the monitor 2, while the D/A converter 17 is converting the image data from the frame buffer 40 into video signals, the picture-signal processor 11 must create and store image data for the next screen in the frame buffer 40. However, to prevent an error from being generated in the data, the CPU 6, the picture-signal processor 11, and the D/A converter 17 are disabled to simultaneously access the same area in the RAM 8.

Accordingly, in general, the command buffer 30 and the frame buffer 40 are each provided with storage areas for at least two screens so that while the rendering commands and image data stored in the RAM 8 are being used, rendering commands, and image data for the next screen, are created and stored in the RAM 8.

Figure 3:
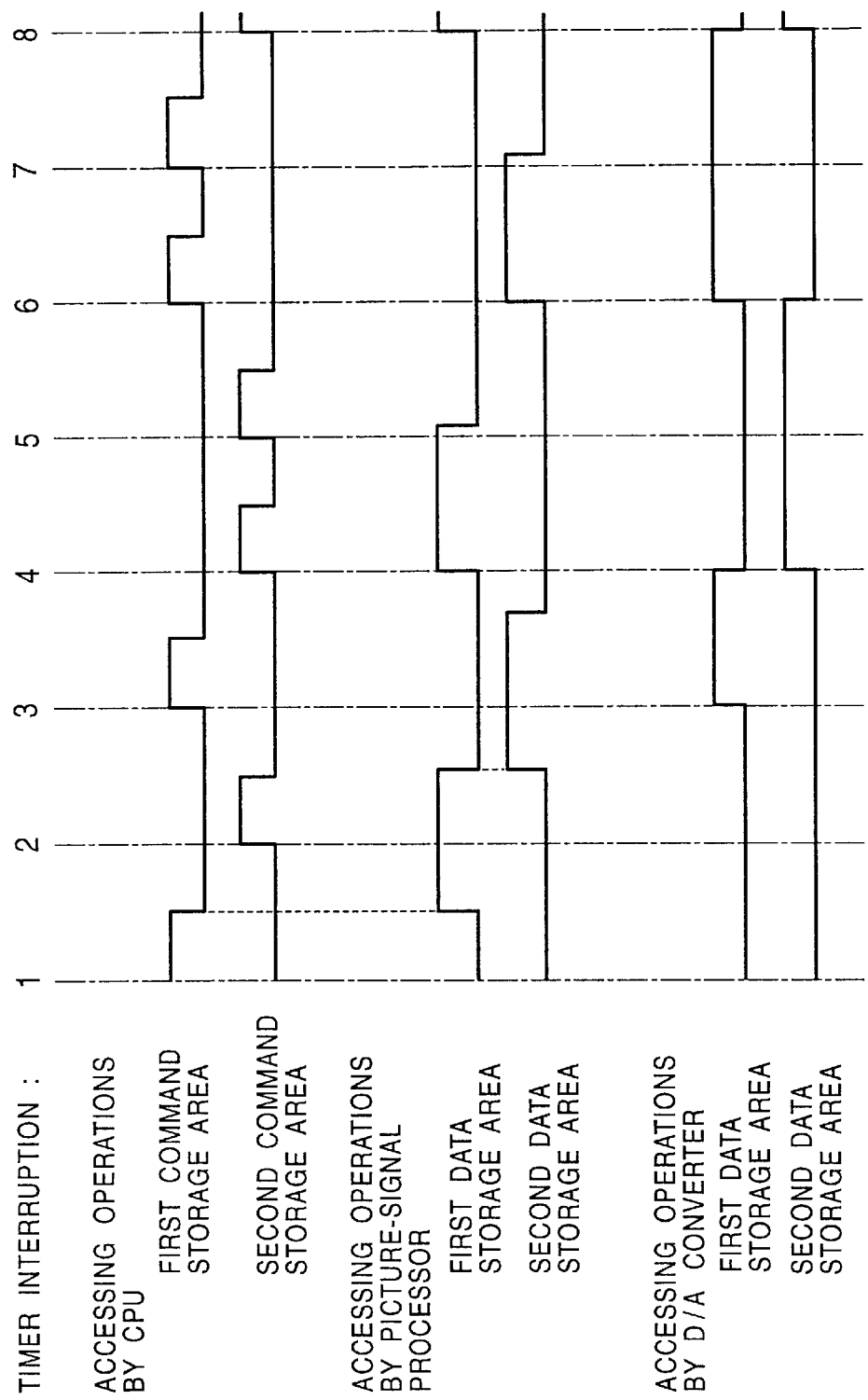
FIG. 3 is a timing chart illustrating double buffer control.

FIG. 3 is a timing chart showing the case where the command buffer 30 and the frame buffer 40 are each provided with storage areas for at least two screens, in other words, the timing chart shows the operations of accessing the RAM 8 by the CPU 6, the picture-signal processor 11, and the D/A converter 17 in the case where the frame buffer 40 shown in FIG. 2 is not provided with the third data storage area 43.

The predetermined period (hereinafter referred to as "one interruption period") is set so as to be synchronized with scanning lines on the monitor 2. Thus, the time required by the D/A converter 17 to create the video signals from the image data is one interruption period. In addition, the creation of a rendering command by the CPU (command creating unit) 6 can be performed within one interruption period. However, as the complexity of an image to be displayed on the monitor 2 increases, the time required by the picture-signal processor 11 to create image data may be one interruption period or less. FIG. 3 shows the case where the time for rendering-command creation by the CPU 6 is not greater than one interruption period and the time for image-data creation by the picture-signal processor 11 is not less than one interruption period (e.g., 1.01 interruption periods).

At the first interruption, the CPU 6 creates and stores a rendering command in the first command storage area 31 before finishing its operation. Subsequently, the picture-signal processor 11 uses a command in the first command storage area 31 to create image data, and initiates the storing of the created image data in the first data storage area 41.

At the second interruption, the CPU 6 creates and stores the next rendering command in the second command storage area 32 before finishing its operation. In addition, the picture-signal processor 11 continuously performs the creation and storing of image data based on the rendering command from the first command storage area 31. At the completion of this operation, the picture-signal processor 11 initiates the operation of accessing the second data storage area 42 by creating and storing the next image data based on the command from the second command storage area 32.

At the third interruption, the CPU 6 creates and stores the next rendering command in the first command storage area 31 before finishing its operation. Conversion from the image data stored in the first data storage area 41 into the video signals by the D/A converter 17 is performed for one interruption period. Also, the picture-signal processor 11 continuously performs the creation and storing of image data based on the rendering command in the second command storage area 32. Even when this operation is completed, the picture-signal processor 11 stands by without creating and storing the next image data because the D/A converter 17 is accessing the first data storage area 41.

At the fourth interruption, the CPU 6 creates and stores the next rendering command in the second command storage area 32 before finishing its operation. Conversion from the image data stored in the first data storage area 42 into the video signals by the D/A converter 17 is performed for one interruption period. In addition, since the operation of accessing the first data storage area 41 ends, the picture-signal processor 11 initiates the creation and storing of image data based on the rendering command from the first command storage area 31, in the first data storage area 41.

At the fifth interruption, the CPU 6 creates and stores the next rendering command in the second command storage area 32 before finishing its operation since the picture-signal processor is accessing the first command storage area 31. Accordingly, the rendering command stored in the second command storage area 32 at the second interruption is overwritten and is thereby deleted.

Although the D/A converter 17 tries to perform conversion from the image data stored in the first data storage area 41 into video signals at the start of the fifth interruption, the conversion has not been completed since the picture-signal processor 11 has initiated conversion at the start of the fourth interruption. In addition, since the first data storage area 41 is being accessed, the creation of video signals from the image data in the second data storage area 42 is again performed for one interruption period. Therefore, two successive frames are displayed on the monitor 2, whereby a displayed image is deformed.

The picture-signal processor 11 completely stores the image data in the first data storage area 41, and stands by since the D/A converter 17 is accessing the second data storage area 42.

At the sixth interruption, the CPU 6 creates and stores the next rendering command in the first command storage area 31 before finishing its operation. Conversion from the image data into video signals by the D/A converter 17 is performed for one interruption period. Since the picture-signal processor 11 finishes accessing the first data storage area 41, it initiates the creation of image data based on the command from the second command storage area 32 and the storing of the created data in the second data storage area 42.

At the seventh interruption, the CPU 6 creates and stores the next rendering command in the first command storage area 31 before finishing its operation since the picture-signal processor 11 is accessing the second command storage area 32. Accordingly, the rendering command stored in the first command storage area 31 at the sixth interruption is overwritten and is thereby deleted.

Although the D/A converter 17 tries to perform conversion from the image data stored in the second data storage area 42 into video signals at the start of the seventh interruption, the conversion has not been completed since the picture-signal processor 11 has initiated conversion at the start of the sixth interruption. In addition, since the second data storage area 42 is being accessed, the creation of video signals from the image data in the first data storage area 41 is again performed for one interruption period. Therefore, two successive frames are displayed on the monitor 2, whereby a displayed image is deformed.

The picture-signal processor 11 completely stores the image data in the second data storage area 42, and stands by since the D/A converter 17 is accessing the first data storage area 41.

Thereafter, similar accessing is performed. In the case where an image to be displayed on the monitor 2 is complicated and the creation of image data by the picture-signal processor 11 requires one interruption period or greater, as described above, the same image is displayed in two successive frames on the monitor 2 every two frames, whereby the displayed image is deformed. Accordingly, in this embodiment, the frame buffer 40 includes the third data storage area 43, as shown in FIG. 2.

Control using only the data storage areas of the frame buffer 40 for two screens, as shown in FIG. 3, is hereinafter referred to as "double buffer control".

Figure 4:
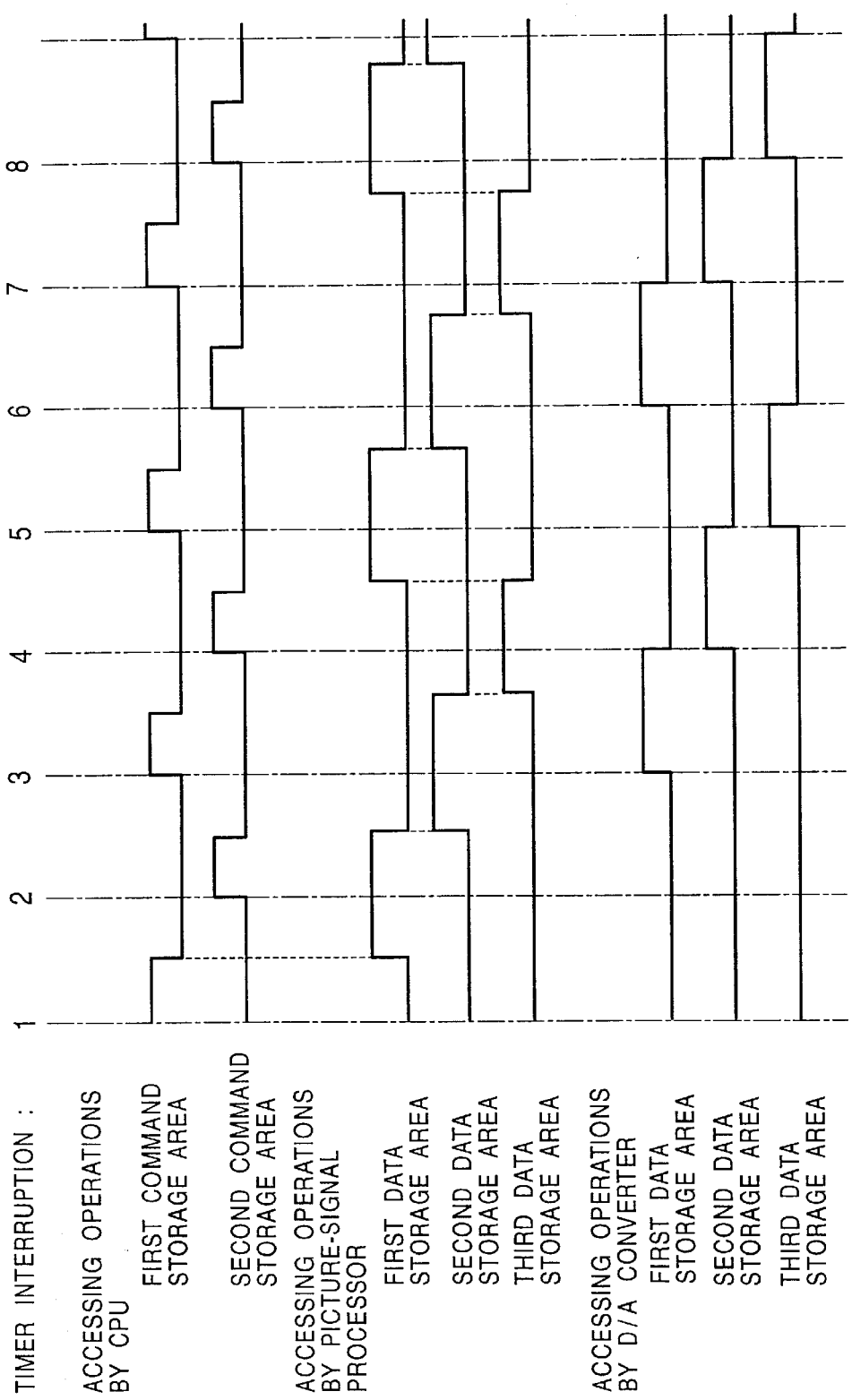
FIG. 4 is a timing chart illustrating triple buffer control.

FIG. 4 is a timing chart showing the case where the frame buffer 40 is provided with the third data storage area 43, in other words, the case where the CPU 6, the picture-signal processor 11, and the D/A converter 17 access the RAM 8. In also the timing chart shown in FIG. 4, it is assumed that the time for creating a rendering command by the CPU 6 is not greater than one interruption period and that the time of creating image data by the picture-signal processor 11 requires not less than one interruption period (e.g., 1.01 interruption periods).

At the first interruption, the CPU 6 creates and stores a rendering command in the first command storage area 31 before finishing its operation. Subsequently, the picture-signal processor 11 initiates the creation of image data based on the rendering command from the first command storage area 31, and the storing of the created image data in the first data storage area 41.

At the second interruption, the CPU 6 creates and stores the next rendering command in the second command storage area 32 before finishing its operation. In addition, the picture-signal processor 11 continuously performs the creation of image data based on the rendering command from the first command storage area 31, and the storing of the created image data. When the picture-signal processor 11 completes this operation, it initiates the operation of accessing the second data storage area 42 by creating and storing the next image data based on the rendering command from the second command storage area 32.

At the third interruption, the CPU 6 creates and stores the next rendering command in the first command storage area 31 before finishing its operation. Conversion from the image data stored in the first data storage area 41 into video signals by the D/A converter 17 is performed for one interruption period. In addition, the picture-signal processor 11 continuously performs the creation of image data based on the rendering command from the second command storage area 32 and the storing of the created data. When the picture-signal processor 11 completes this operation, it initiates the operation of accessing the third data storage area 43 by creating and storing the next image data based on the rendering command from the first command storage area 31.

At the fourth interruption, the CPU 6 creates and stores the next rendering command in the second command storage area 32 before finishing its operation. Conversion from the image data stored in the second data storage area 42 into video signals is performed for one interruption period. In addition, the picture-signal processor 11 continuously performs the creation of image data based on the rendering command from the first command storage area 31, and the storing of the created image data. When the picture-signal processor 11 completes this operation, it initiates the operation of accessing the first data storage area 41 by creating and storing the next image data based on the rendering command from the second command storage area 32.

At the fifth interruption, the CPU 6 creates and stores the next rendering command in the first command storage area 31 before finishing its operation. Conversion from the image data stored in the third data storage area 43 into video signals by the D/A converter 17 is performed for one interruption period. In addition, the picture-signal processor 11 continuously performs the creation of image data based on the rendering command from the second command storage area 32 and the storing of the created data. When the picture-signal processor 11 completes this operation, it initiates the operation of accessing the second data storage area 42 by creating and storing the next image data based on the rendering command from the first command storage area 31.

At the sixth interruption, CPU 6 creates and stores the next rendering command in the second command storage area 32 before finishing its operation. Conversion from the image data stored in the first data storage area 41 into video signals by the D/A converter 17 is performed for one interruption period. In addition, the picture-signal processor 11 continuously performs the creation of image data based on the rendering command from the first command storage area 31 and the storing of the created data. When the picture-signal processor 11 completes this operation, it initiates the operation of accessing the third data storage area 43 by creating and storing the next image data based on the rendering command from the second command storage area 32.

Thereafter, similar accessing operations are performed. Also, in the case shown in FIG. 4, when the time for creating image data by the picture-signal processor 11 requires 1.01 periods, an image displayed on the monitor 2 is deformed one in ten frames. The deformation is almost not noticeable compared with the case where a displayed image is deformed when double buffer control is performed.

Control using data storage areas for three screens in the frame buffer 40 is hereinafter referred to as "triple buffer control".

Referring back to FIG. 2, the CPU 6 includes, as functional blocks, an operation-detecting unit 50 and a game-progress-control unit 60. The operation-detecting unit 50 detects, based on operation signals output from the controller 16, the contents of operations on the controller 16.

The game-progress-control unit 60 controls the other blocks of the game system 1 based on the game program on the recording medium 5 and the contents of operations on the controller 16. The game-progress-control unit 60 includes, as functional blocks, a condition-determining unit 61, a switching-designation unit 62, a processing-control unit 63, and a switching-terminating unit 64. The processing-control unit 63 includes an old-scene holding unit 65, an instruction-controlling unit 66, and a transparency-setting unit 67.

The condition-determining unit 61 determines whether predetermined game-clearing conditions are satisfied in scenes of the video game. The game-clearing conditions are set in accordance with the contents of the video game, such as an attack with a predetermined damage against an enemy character by a leading character, and obtainment of a predetermined item by a leading character.

The switching-designation unit 62 outputs a signal for designating the switching of a displayed scene when the condition-determining unit 61 determines that a predetermined game-clearing condition has been satisfied.

The old-scene holding unit 65 in the processing-control unit 65 is constructed so that when the picture-signal processor 11 has stored image data of one scene (hereinafter referred to as an "old scene") in a predetermined data storage area (e.g., the third data storage area 43 in this embodiment) after the switching-designation unit 62 outputs a switching-designation signal while playing the video game, the old-scene holding unit 65 holds the old-scene image data in the predetermined data storage area. The old-scene holding unit 65 stops triple buffer control.

The instruction-controlling unit 66 has the following functions:

(1) a function in which rendering commands for generating image data in which the old scene image masks the image of a new scene are created by pasting the old-scene image data stored in the predetermined data storage area (the third data storage area 43 in this embodiment) on plane polygons provided closer to the viewpoint side (having higher priority of display) than the new scene image and in which the created rendering commands are alternately stored in the first and second command storage areas 31 and 32; and (2) a function that controls the picture-signal processor 11 to alternately use the rendering commands stored in the first and second command storage areas 31 and 32 to generate image data and that controls the first and second data storage areas 41 and 42 to alternately perform updating and storing, excluding the predetermined data storage area (the third data storage area 43 in this embodiment), in other words, the function performing the above-described double buffer control.

According to the function (1), the rendering commands use the old scene image as an image closest to the viewpoint, that is, an image having the highest priority of display, and generate the image of a new scene behind the old scene image (farther than the viewpoint, i.e., the side having lower priority of display). Accordingly, by setting the degree of transparency of the old scene image to a predetermined factor, an image in which the old scene image is covered with the new scene image is displayed on the monitor 2.

The transparency-setting unit 67 increases, in each predetermined period (or each multiple of the predetermined period), the degree of transparency of the textures, that is, the degree of transparency of the old-scene image data stored in the third data storage area 43 at a predetermined rate. The degree of transparency of the old-scene image data is increased by increasing the mixing ratio of the new-scene color data when the old-scene color data and the new-scene color data are mixed.

The switching-terminating unit 64 terminates the operation of the processing-control unit 63 when the degree of transparency set by the transparency-setting unit 67 has reached a predetermined value (e.g., 100%).

Figure 5:
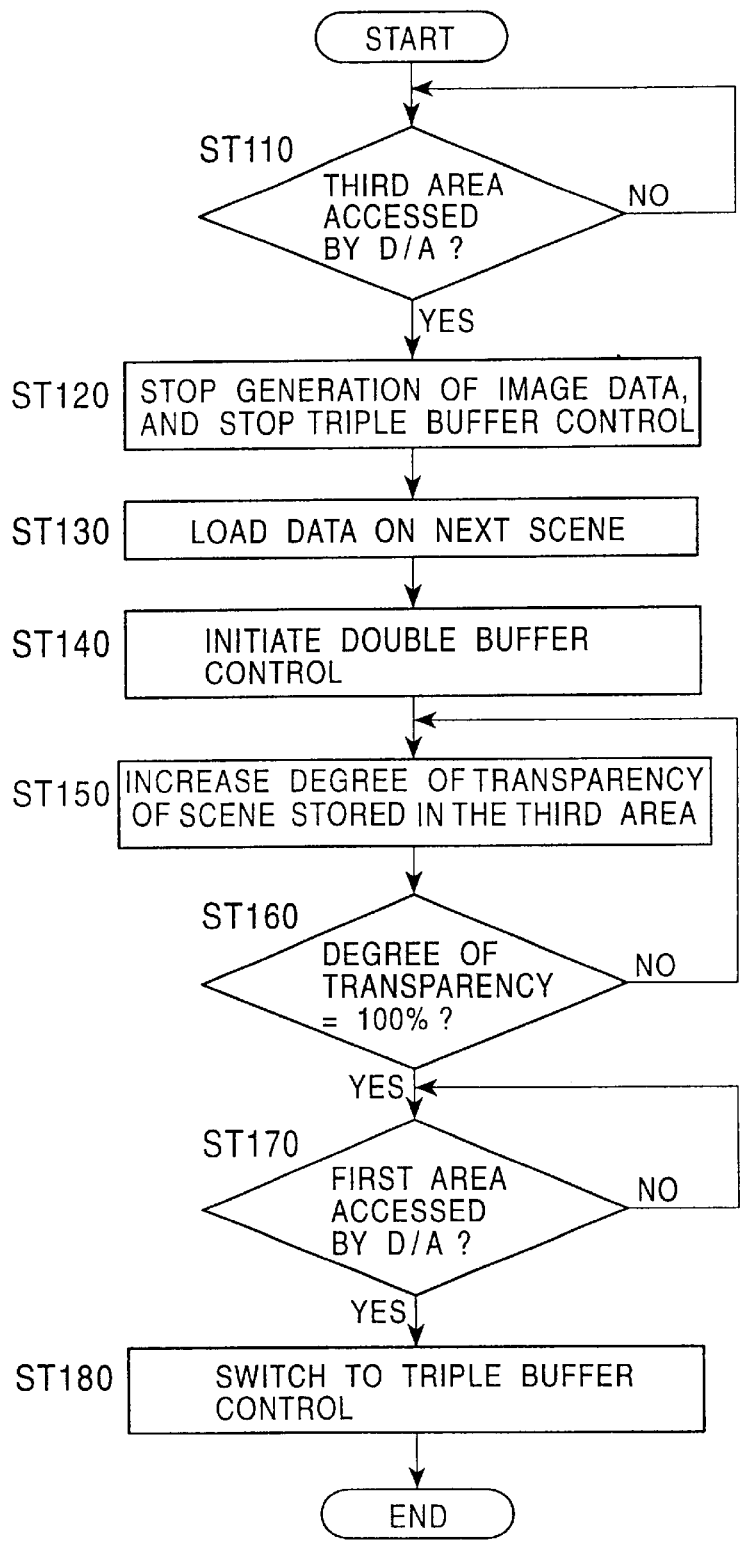
FIG. 5 is a flowchart showing an example of a process of displayed scene switching.
Figure 6:
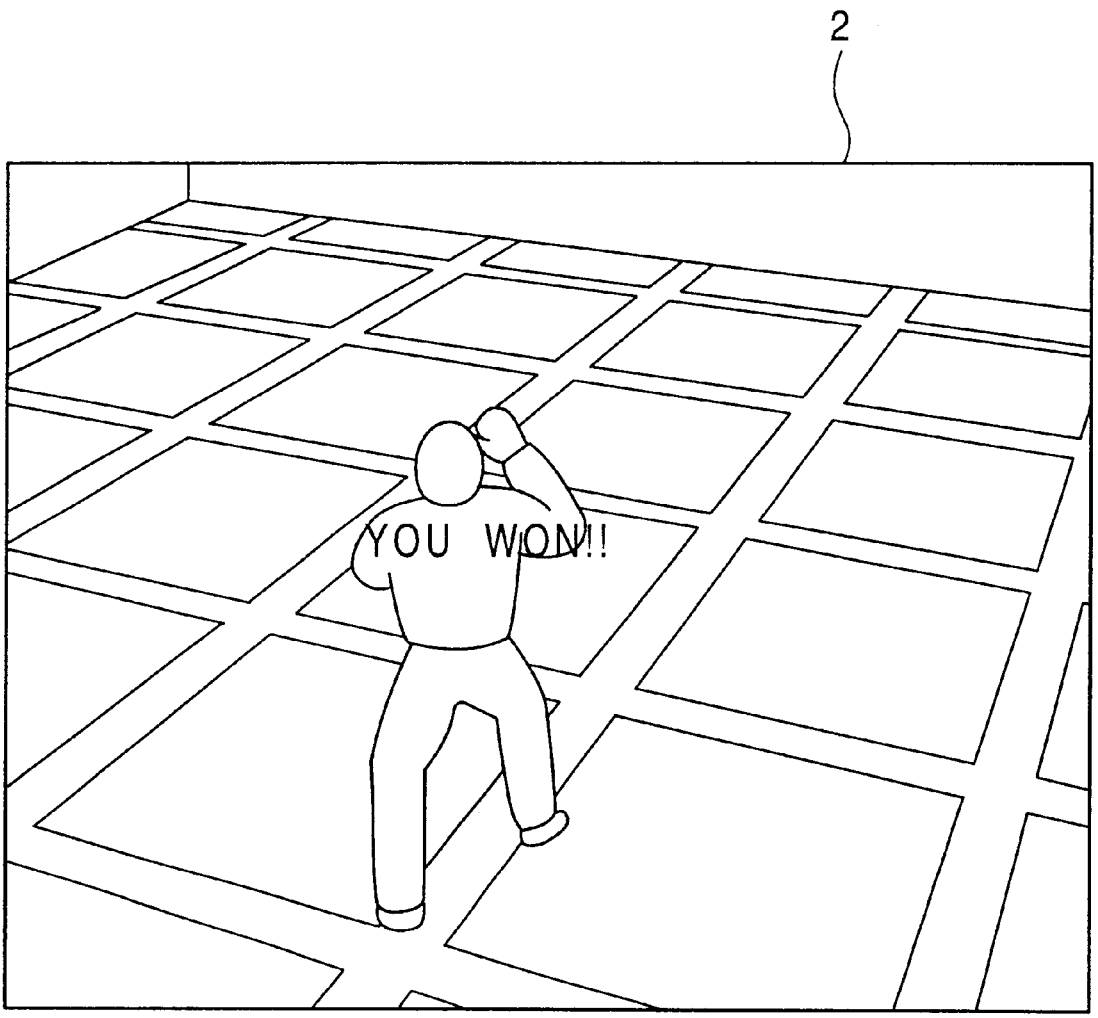
FIG. 6 is a drawing showing a game screen displayed while displayed scene switching is being performed.

FIG. 5 shows a process performed by a displayed scene switching program (routine). FIGS. 6 to 9 show game screens displayed while displayed scenes are being switched.

When predetermined game-clearing condition provided in the old scene of the video game is satisfied, and a switching-designation signal is output, transfer to the process shown in FIG. 5 is performed.

The process stands by until the D/A converter 17 accesses the third data storage area 43, and the triple buffer control described using the timing chart shown in FIG. 4 is continuously performed ("NO" in step ST110). When the D/A converter 17 initiates an access to the third data storage area 43 ("YES" in step ST110), the operation of creating image data by the picture-signal processor 11 or buffer control by the CPU 6 is terminated (step ST120), and program data on the next scene are loaded from the recording medium 5 into the RAM 8 (step ST130). In accordance with the terminating operation in step ST120, the still picture shown in FIG. 6, which is based on the image data stored in the third data storage area 43, is continuously displayed on the monitor 2 during step ST130.

Subsequently, the double buffer control described using the timing chart shown in FIG. 3 is initiated (step ST140). In other words, rendering commands for a new scene are created using the first and second command storage areas 31 and 32. The rendering commands are created so that the image data stored in the third data storage area 43 are used as textures to be pasted on plane polygons provided on the front side (closer to the viewpoint) of the new scene, image data are created from the rendering commands. The image data are alternately stored in the first and second data storage areas 41 and 42.

Figure 7:
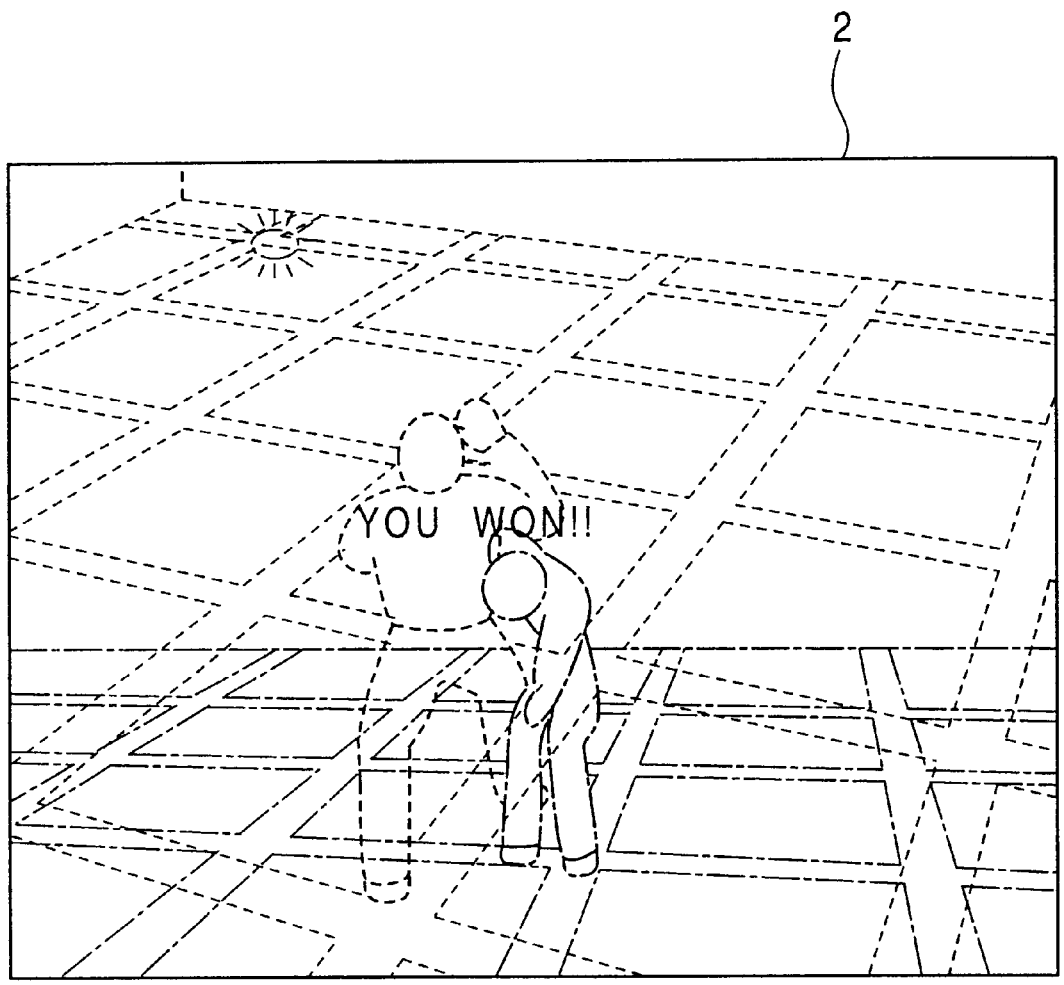
FIG. 7 is a drawing showing a game screen displayed while displayed scene switching is being performed.

The degree of transparency of the old-scene image is increased by a predetermined ratio (step ST150), as shown in FIG. 7. In FIG. 7, the old scene, which is displayed to be slightly transparent, is represented by the dotted line, and the new scene is represented by the chain line.

Figure 8:
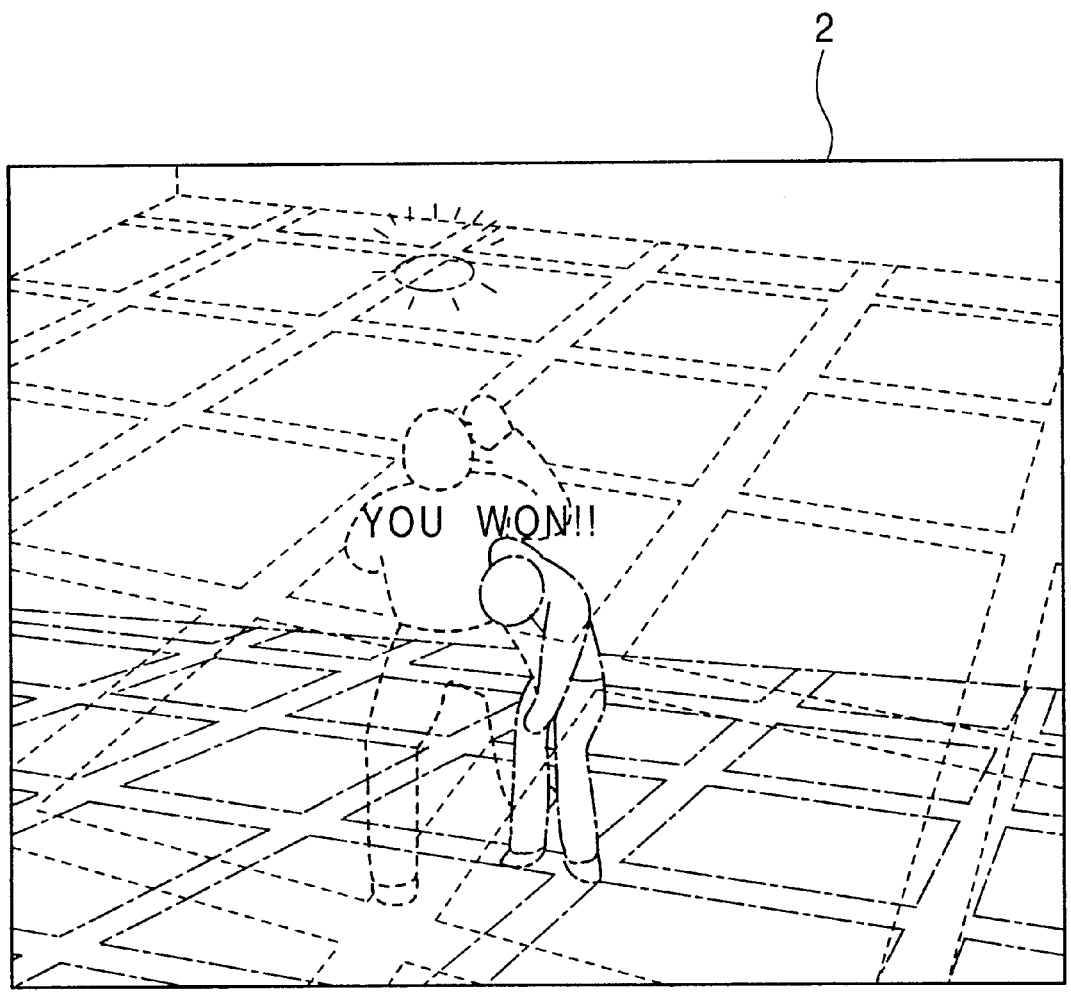
FIG. 8 is a drawing showing a game screen displayed while displayed scene switching is being performed.

Until the degree of transparency of the old-scene image reaches 100% ("NO" in step S160), the degree of transparency increases by a predetermined ratio, for each interruption (steps ST150 to ST160). In FIG. 8, the old scene, whose transparency is greater than that in FIG. 7, is represented by the thin dotted line, and the new scene is represented by the thick chain line.

Figure 9:
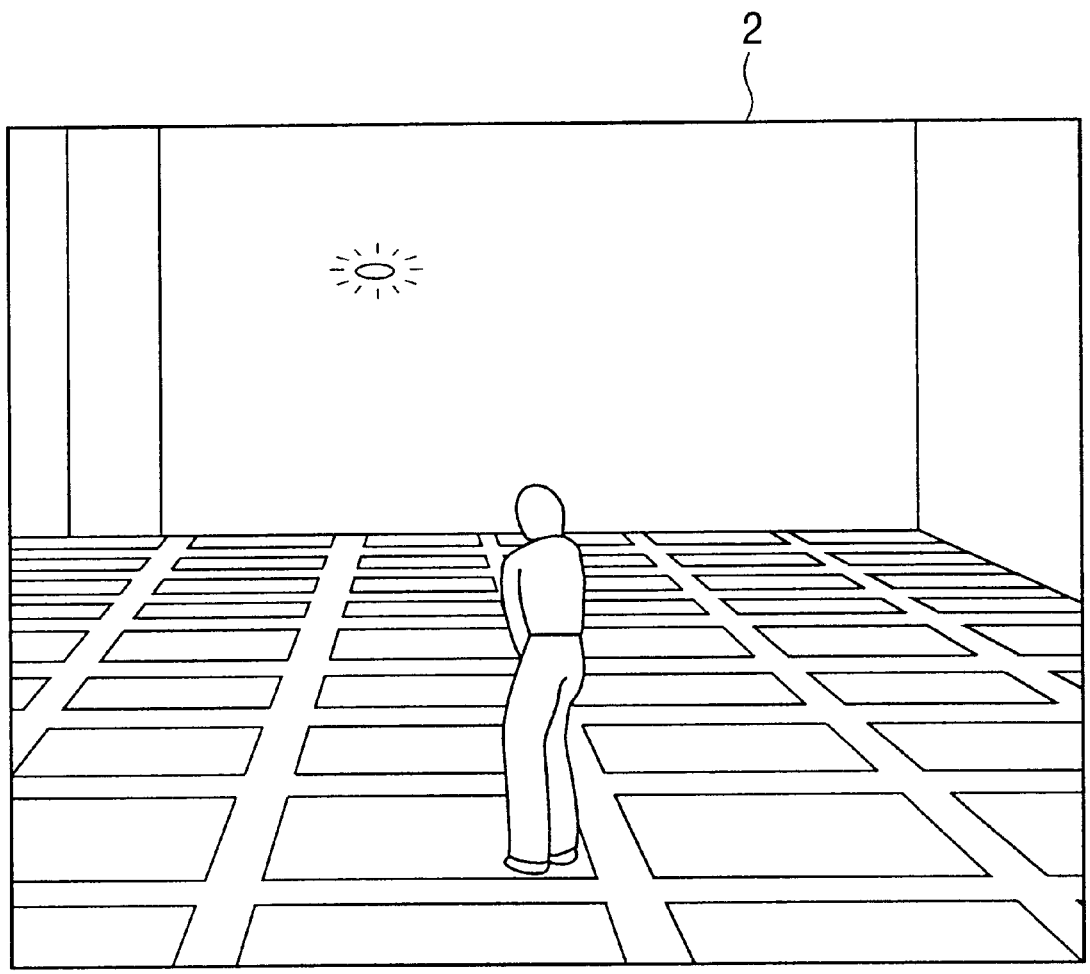
FIG. 9 is a drawing showing a game screen displayed while displayed scene switching is being performed.

When the degree of transparency of the old-scene image reaches 100%, and the old scene disappears ("YES" in step ST160), as shown in FIG. 9, the double buffer control is continuously performed until the D/A converter 17 initiates an access to the first data storage area 41 ("NO" in step ST170). When the first data storage area 41 is accessed ("YES" in step ST170), switch to the triple buffer control (described using FIG. 4) is performed (step ST180), and the displayed scene switching routine is terminated.

As described above, according to this embodiment, by performing the steps of holding the old scene image in the third data storage area 43 when the switching-designation signal is output, controlling the picture-signal processor 11 to generate image data for disposing the old scene image held in the third data storage area 43 on the viewpoint side of the new scene image, and alternately storing the generated data in the first and second data storage areas 41 and 42 while increasing the degree of transparency of the old-scene image data held in the third data storage area 43 in each predetermined period, a picture in which the new scene image and the old scene image are covered with each other can be displayed on the monitor 2, whereby the scene displayed on the monitor 2 can be gradually switched from the old scene to the new scene by controlling the old scene to fade out and controlling the new scene to fade in. This provides preferable image effects.

By ordinarily performing triple buffer control, and performing double buffer control only for the displayed scene switching so that the third data storage area 43 is not used for displaying the new scene, the old-scene image data can be held in the third data storage area 43. This enables preferable displayed scene switching without increasing the storage capacity of the RAM 8.

Since the storing of image data for one screen requires a large storage capacity, the provision of an additional data storage area requires an increase in the storage capacity of the RAM 8. However, according to the foregoing embodiment, the need for increasing the storage capacity can be eliminated.

In addition, by performing double buffer control when displayed scene switching is performed, a moving picture can be displayed as the new scene image. Accordingly, smooth transfer to the new scene can be performed, which enables preferable displayed scene switching.

In double buffer control, when a displayed image is complicated, the image looks deformed. However, the double buffer control is performed for only a short time during displayed, so that the double buffer control does not greatly affect the image. Also, by setting a game program to be stored on the recording medium 5 so that the image is not complicated in predetermined initial periods of the new scene, effects of the double buffer control can be minimized.

When the old-scene image data are stored in the third data storage area 43 after a switching-designation signal is output, the image data are maintained, whereby the old-scene image data are maintained in the same data storage area. Therefore, an access to a data storage area, in the case where the instruction-controlling unit 66 controls the picture-signal processor 11 to perform double buffer control, can be easily performed.

The present invention is not limited to the foregoing embodiment, but the following modifications of the present invention may be employed.

(1) Although the degree of transparency of the old scene image is monotonically increased in the foregoing embodiment, the present invention is not limited thereto, but the degree of the transparency may be increased by using another manner such as a technique of gradually increasing, as a whole, the degree of transparency while repeatedly increasing and reducing the degree of transparency.

(2) Although the degree of transparency of the old scene image is simply increased in the foregoing embodiment, the present invention is not limited thereto, but another type of display operation may be performed in addition to the increase of the degree of transparency. FIGS. 10 to 17 show game screens displayed while displayed screen switching is being performed in a form set so that an old scene image is divided into a plurality of portions and the portions are sent flying so as to be separate from one another.

In this form, the instruction-controlling unit 66 has a function of creating a rendering command for dividing the old-scene image data held in the third data storage area 43 into horizontally long rectangular textures, setting the rectangular polygons on the viewpoint side of the new scene image, and pasting each texture on each polygon, as well as creating, in each predetermined period, rendering commands for sending the rectangular polygons flying in accordance with an elapse of time (i.e., for leading the rectangular polygons outside the view-field range) before alternately storing the created rendering commands in the first and second command storage areas 31 and 32.

In addition, similarly to the foregoing embodiment, the transparency-setting unit 67 increases the degree of transparency of the rectangular textures, i.e., the degree of transparency of the old-scene image data stored in the third data storage area 43, by a predetermined ratio in each predetermined period. When the degree of transparency set by the transparency-setting unit 67 reaches a predetermined value (e.g., 100%), or a scatter of the rectangular polygons reaches a predetermined level, in other words, all or a predetermined number of polygons reaches outside the viewfield range, the switching-terminating unit 64 terminates the operation of the processing-control unit 63.

Figure 10:
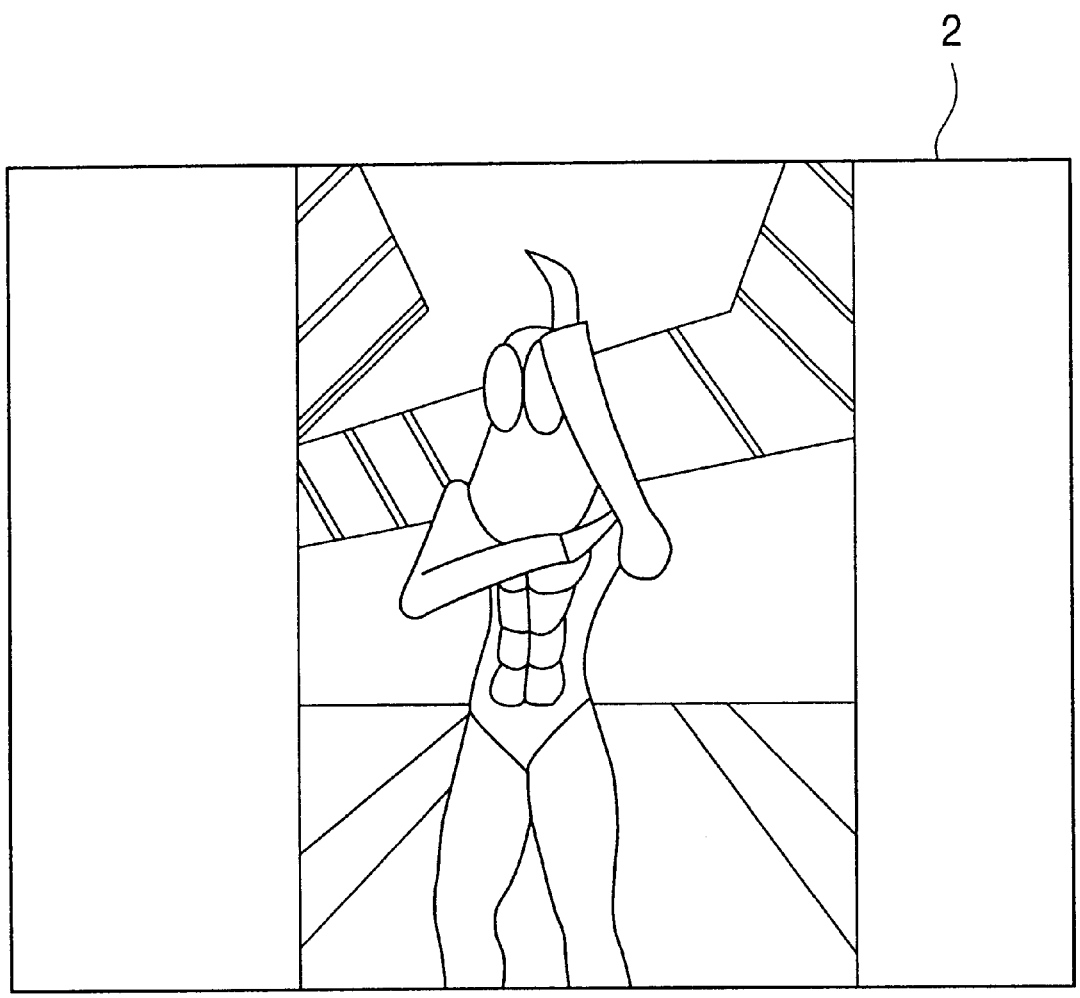
FIG. 10 is a drawing showing a game screen displayed while displayed-screen switching according to another embodiment of the present invention.
Figure 11:
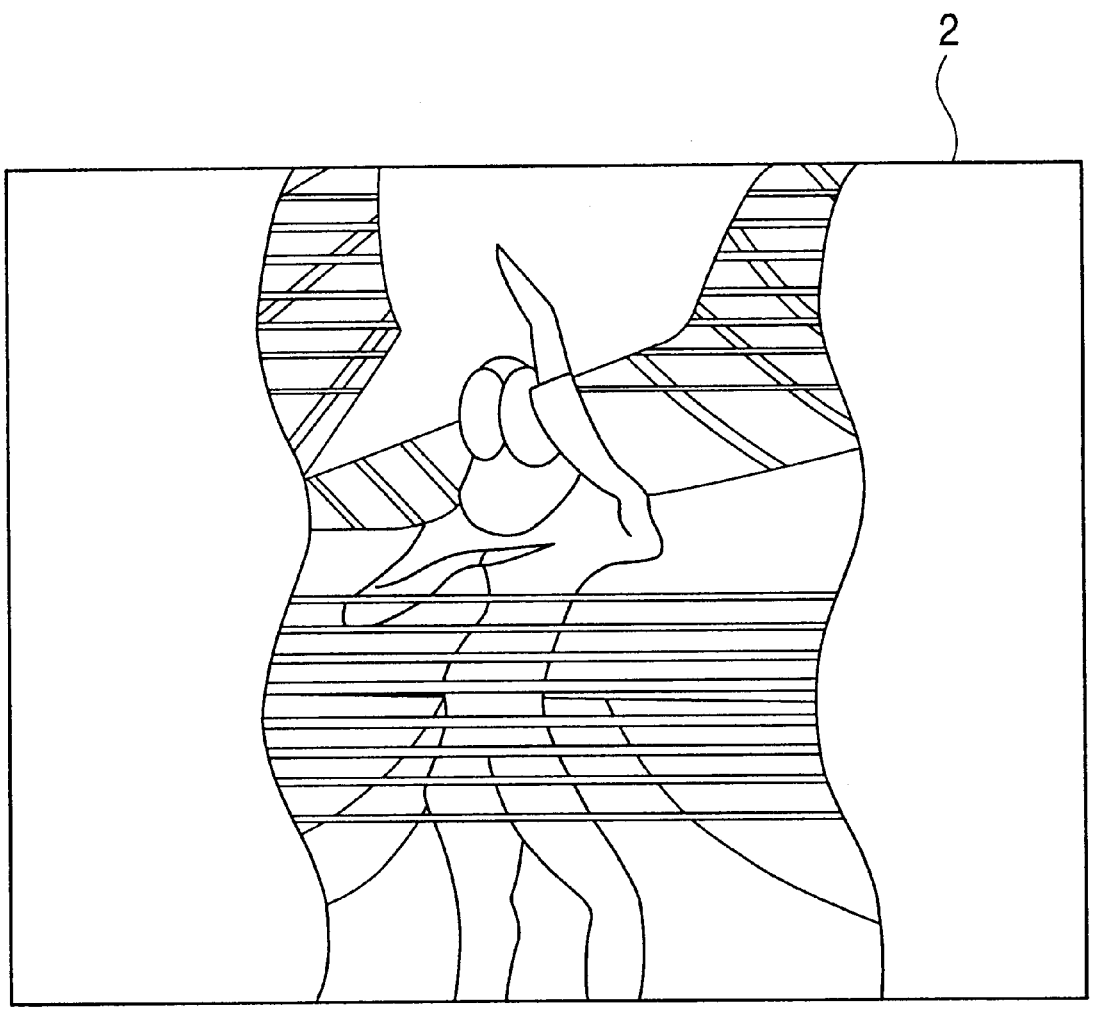
FIG. 11 is a drawing showing a game screen displayed while displayed-screen switching according to another embodiment of the present invention.
Figure 12:
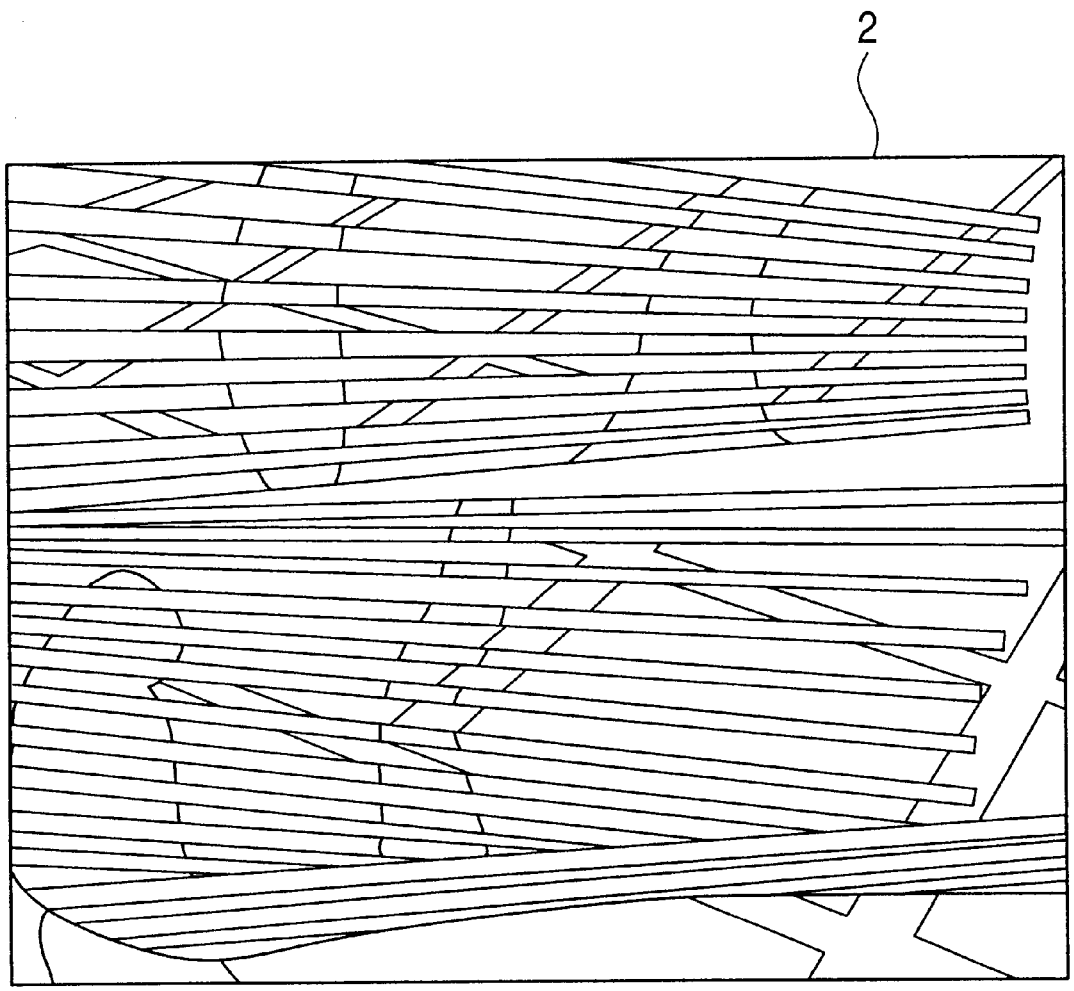
FIG. 12 is a drawing showing a game screen displayed while displayed-screen switching according to another embodiment of the present invention.
Figure 13:
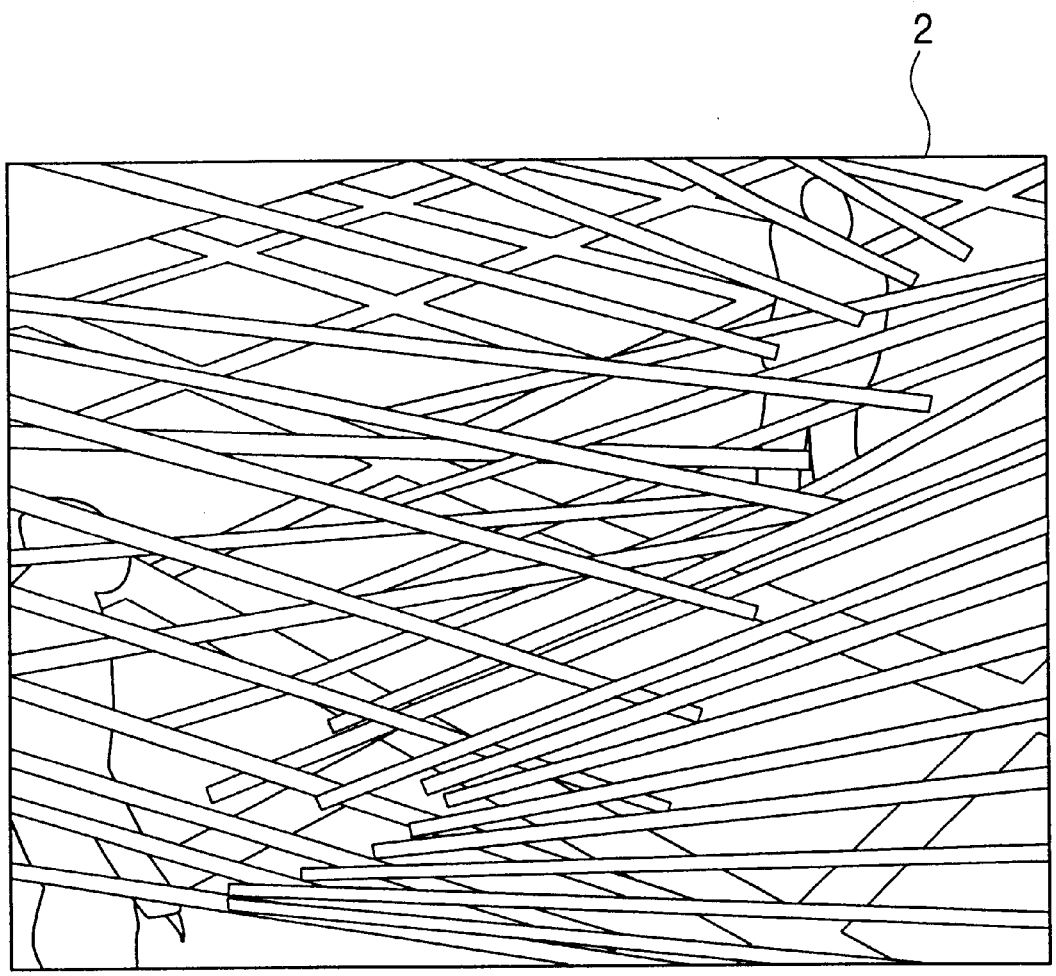
FIG. 13 is a drawing showing a game screen displayed while displayed-screen switching according to another embodiment of the present invention.
Figure 14:
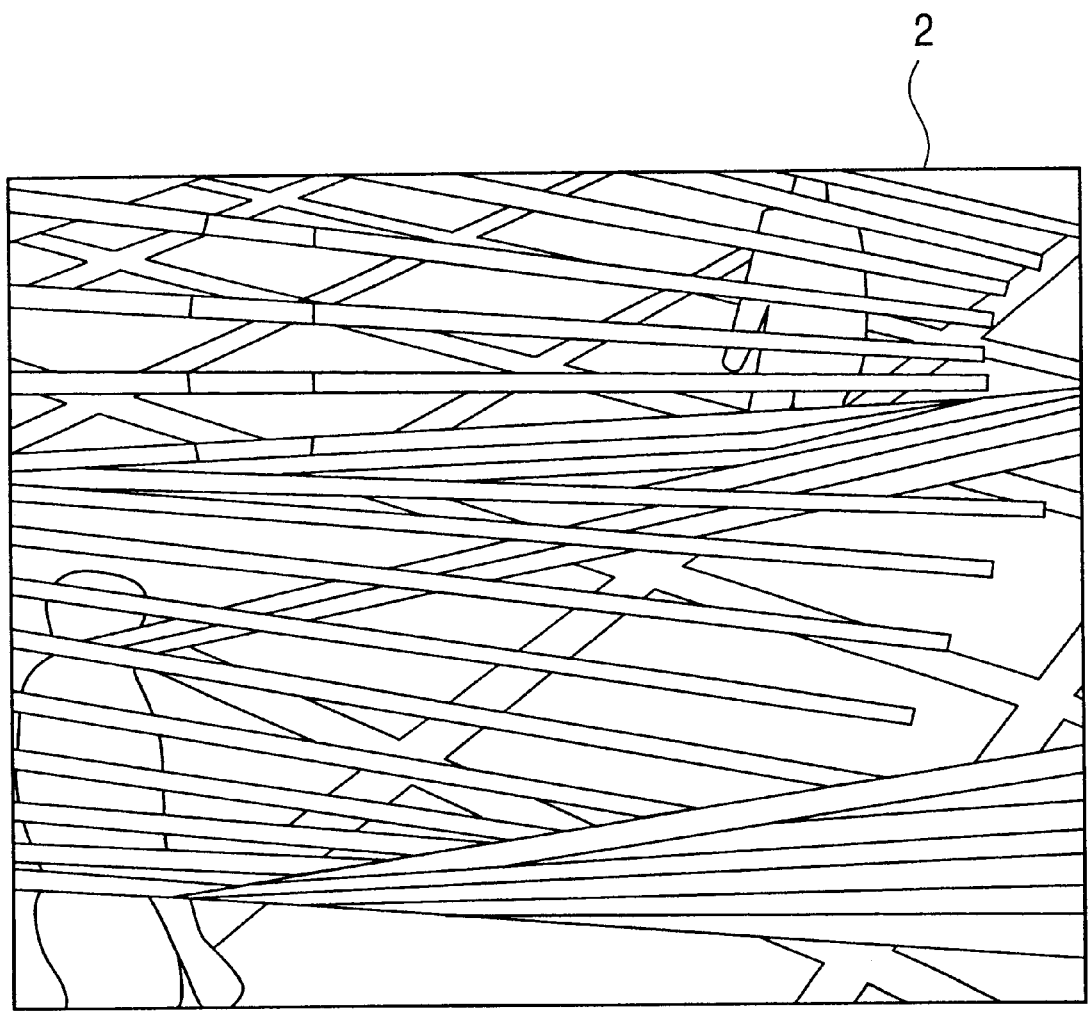
FIG. 14 is a drawing showing a game screen displayed while displayed-screen switching according to another embodiment of the present invention.
Figure 15:
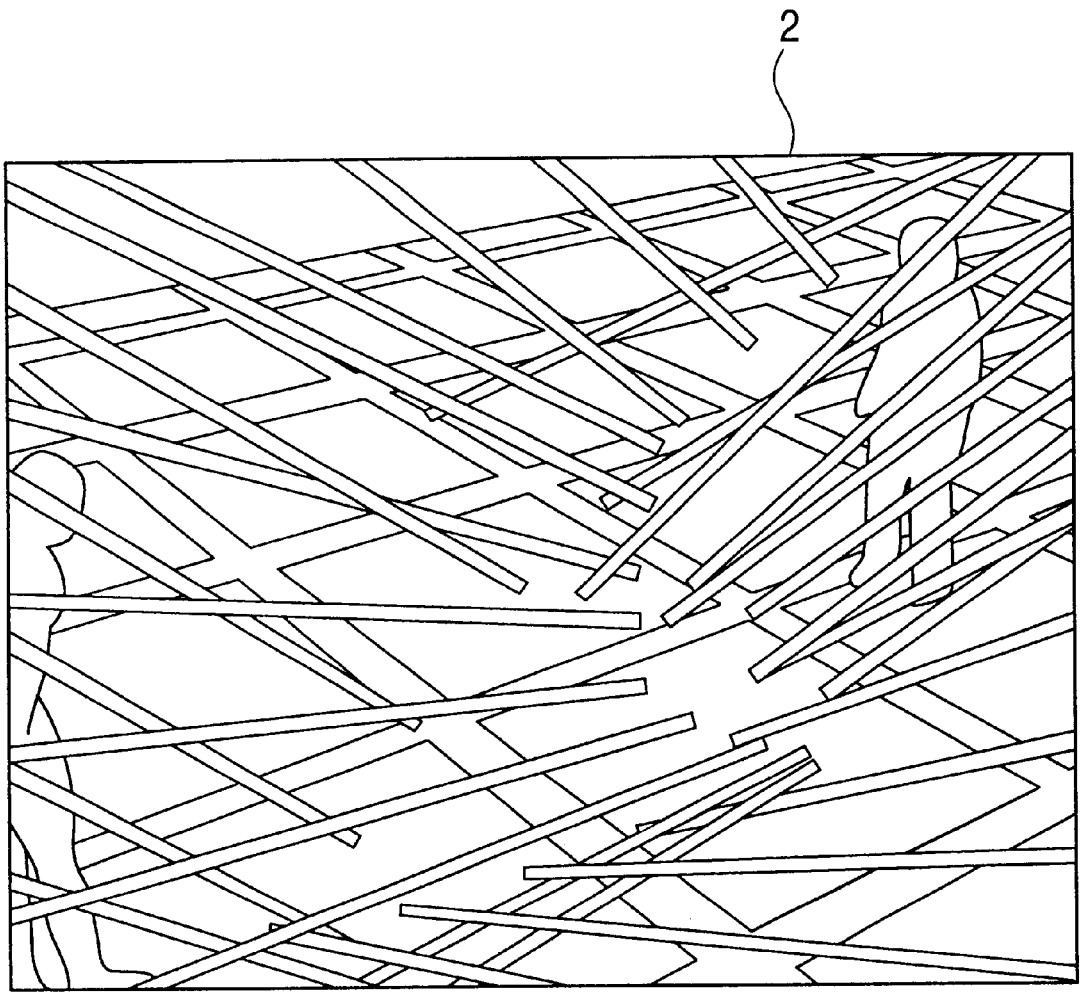
FIG. 15 is a drawing showing a game screen displayed while displayed-screen switching according to another embodiment of the present invention.
Figure 16:
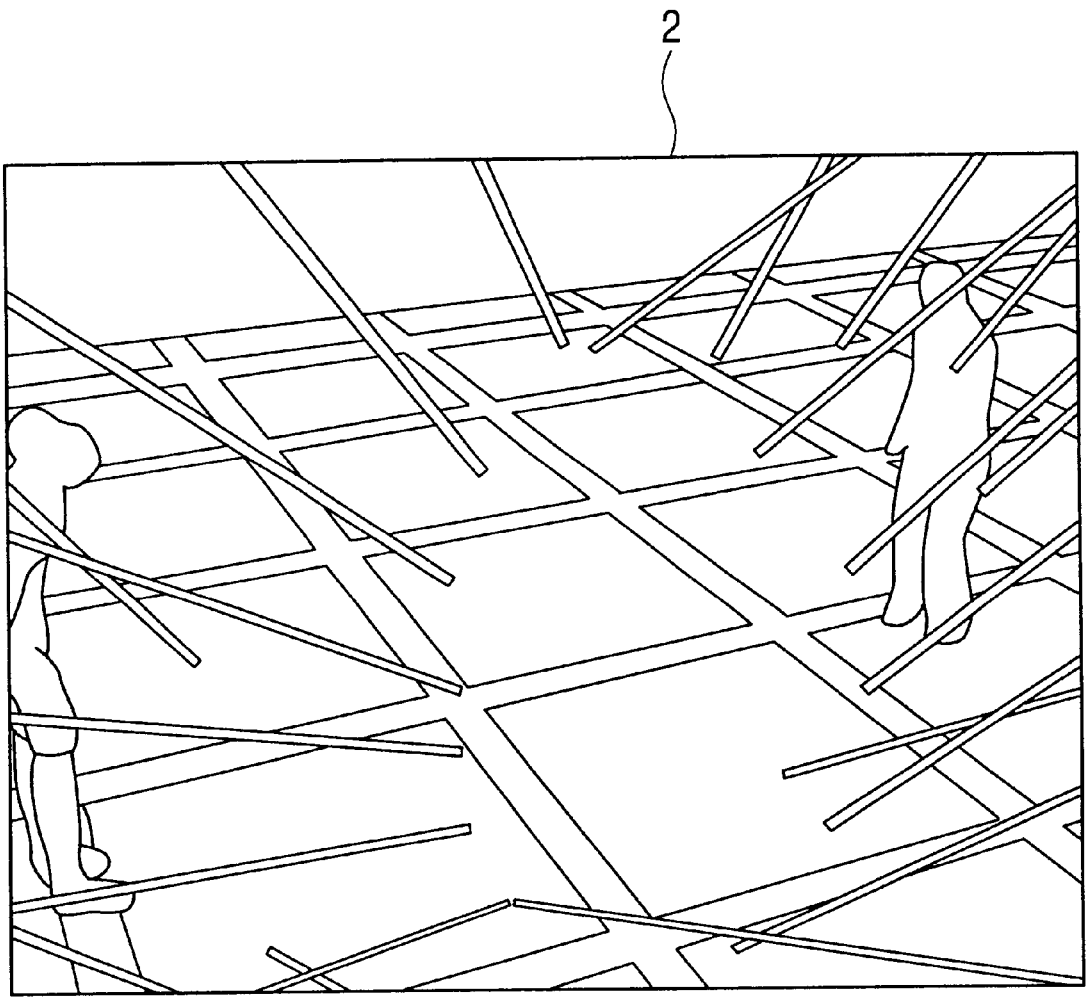
FIG. 16 is a drawing showing a game screen displayed while displayed-screen switching according to another embodiment of the present invention.

In other words, according to this modification, the old scene image shown in FIG. 10 is pasted, as the divided rectangular textures shown in FIG. 11, on the rectangular polygons set to be closest to the viewpoint. Although the image shown in FIG. 11 looks deformed due to minute shifts in three-dimensional coordinates setting the polygons, the deformation is momently displayed on the monitor 2, which is not noticeable.

Figure 17:
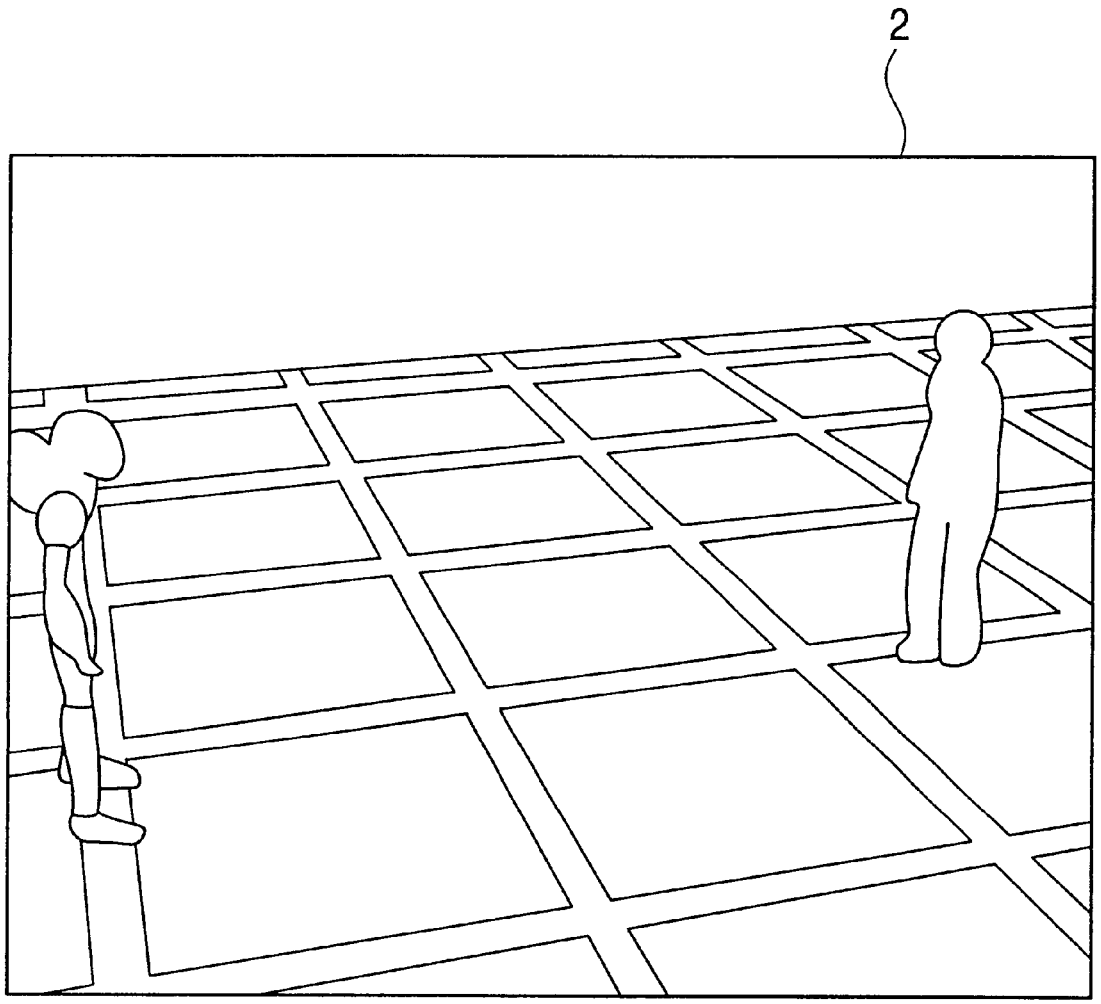
FIG. 17 is a drawing showing a game screen displayed while displayed-screen switching according to another embodiment of the present invention.

Subsequently, double buffer control is initiated, and the rectangular polygons are sent flying in each predetermined period while the degree of their transparency is increased, as shown in FIGS. 12 to 16. At this time, the image of a new scene is generated behind the old scene image (farther from the viewpoint) composed of the rectangular polygons, as shown in FIGS. 12 to 16. When the degree of transparency reaches 100%, or the scatter of the rectangular polygons ends, as shown in FIG. 17, the displayed scene switching operation ends, and the new scene image is displayed on the monitor 2.

Also, in this modification, displayed scene switching from the old scene to the new scene can be preferably performed.

(3) In the modification (2), by dividing the old scene image into a plurality of portions, and sending the portions flying, without changing the degree of transparency of the old scene image, the portions may be separated from one another. In also this modification, the new scene image can be gradually displayed by a scatter of the old scene image. Accordingly, similar effects can be obtained.

(4) Although the old scene image is displayed to be closer to the viewpoint than to the new scene image in the foregoing embodiment, the instruction-controlling unit 66 may display the old scene image so that the old scene image is farther from the viewpoint than from the new scene image. In this modification, by gradually reducing the degree of transparency of the new scene image from 100%, displayed scene switching from the old scene to the new scene can be performed as in the foregoing embodiment.

(5) Although a storage area in which the old-scene holding unit 65 holds the old-scene image data is fixed to the third data storage area 43 in the foregoing embodiment, the old-scene image data may be unchanged and held in a data storage area being accessed by the D/A converter 17 at the time that the switching-designation signal is output by the switching-designation 62. In this modification, the instruction-controlling unit 66 may control the picture-signal processor 12 to perform updating and storing by alternately using the other data storage areas excluding the data storage area holding the image data.

(6) Although a three-dimensional image is displayed on the monitor 2 in the foregoing embodiment, a two-dimensional image may be displayed. In this modification, the instruction-controlling unit 66 may control the picture-signal processor 11 to generate image data representing a mixture of the old and new scene images by using both images.

(7) Although a video game machine is constructed in the foregoing embodiment, an image creating apparatus that displays a plurality of scenes on a monitor may be constructed.

What is claimed is:

1. An image creating apparatus for selectively displaying a plurality of animated scenes formed of a plurality of frames on a display means, said image creating apparatus comprising:

image-data storage means including at least three data storage areas, used as frame buffers, each for storing image data for one frame on said display means;

picture-signal processing means for generating image data for one frame at a time and for successively storing the image data generated in ones of the at least three data storage areas in accordance with a first frame buffering system;

image output means for cyclically reading and successively outputting the image data stored in the at least three data storage areas on said display means in accordance with the first frame buffering system;

switching-designation means for outputting a signal for designating switching of the animated scene displayed on said display means from an old animated scene produced using the at least three storage areas and the first frame buffering system to a new animated scene; and processing-control means for controlling switching the animated scene being displayed on said display means from the old animated scene to the new animated scene when the switching-designation signal is output, said processing-control means comprising:

an old-animated scene holding means for holding image data of a last generated frame of the old animated scene in any one of the at least three data storage areas in said image-data storage means; and an instruction-controlling means for controlling said picture-signal processing means to effect:

use of the image data of the last generated frame of the old animated scene with data of the new animated scene to successively generate frames of image data for the new animated scene and to cyclically store the generated image data of the new animated scene in other ones of the at least three data storage areas than the any one of the at least three data storage areas storing the image data of the old scene in accordance with a second frame buffering system using one less frame buffer than said first frame buffering system; and use of the image output means to cyclically read and output the generated image data from the other ones of the at least three data storage areas onto said display means to produce the new animated scene on said display means in accordance with the second frame buffering system.

2. An image creating apparatus according to claim 1, wherein said picture-signal processing means generates, as the image data, the data of an image viewed from a predetermined viewpoint in a virtual three-dimensional space, and wherein said instruction-controlling means controls said picture-signal processing means to generate the image data in a form set so that the image of the old animated scene has higher or lower priority of display to the image of the new animated scene and to cyclically store the generated data in the other data storage areas in said image-data storage means.

3. An image creating apparatus according to claim 1, wherein said instruction-controlling means controls said picture-signal processing means to divide the image of the old animated scene into a plurality of portions and to generate the image data in a form set so that the portions of the image of the old animated scene are separated from one another whenever the image data are cyclically stored in the other data storage areas.

4. An image creating apparatus according to claim 1, wherein said processing-control means includes a transparency-setting means which successively changes the degree of transparency of either the image of the old animated scene or the image of the new animated scene so that the image of the new animated scene is displayed in accordance with an elapse of time and which controls said picture-signal processing means to generate the image data with the changed degree of transparency.

5. An image creating apparatus according to claim 1, further comprising:

said instruction-controlling means controls said picture-signal processing means to generate the image data in a form set so that the image of the old animated scene has higher priority of display to the image of the new animated scene, and transparency-setting means for successively increasing a degree of transparency of the image of the old scene.

6. An image creating apparatus according to claim 1, further comprising a switching-terminating means for terminating the operation of said processing-control means when the degree of transparency of the image of the old animated scene reaches a predetermined value.

7. An image creating apparatus according to claim 1, wherein the any one of the at least three data storage areas holding the image data of the old animated scene is a predetermined data storage area of the at least three data storage areas in said image-data storage means, and the image data of the old animated scene is stored in the predetermined data storage area after the switching-designation signal is output.

8. An image creating apparatus according to claim 1, wherein said image-data storage means consists of first, second, and third data storage areas as the at least three data storage areas.

9. A displayed animated scene switching method for an image creating apparatus for selectively displaying a plurality of animated scenes, formed of a plurality of frames, on a display means, said displayed animated scene switching method comprising the steps of:

generating image data for one frame at a time and for successively storing in accordance with a first frame buffering system the image data generated in ones of at least three data storage areas of an image-data storage means, used as frame buffers, which are each capable of storing the image data of one frame;

cyclically reading and successively outputting the image data stored in the at least three data storage areas on said display means in accordance with the first frame buffering system;

holding, when a signal is output for designating switching of the animated scene displayed on said display means from an old animated scene produced using the at least three data storage areas and the first frame buffering system to a new animated scene, image data of a last generated frame of the old animated scene being displayed on said display means in any one of the at least three data storage areas of said image-data storage means;

using the image data of the last generated frame of the old animated scene with data of the new animated scene to successively generate image data for the new animated scene and to cyclically store the generated image data of the new animated scene in other ones of the at least three data storage areas than the any one of the at least three data storage areas storing the image data of the old scene in accordance with a second frame buffering system using one less frame buffer than said first frame buffering system; and cyclically reading and outputting the generated image data from the other ones of the at least three data storage areas onto said display means to produce the new animated scene on said display means in accordance with the second frame buffering system.

10. A computer-readable recording medium containing a displayed animated scene switch program for an image creating apparatus that selectively displays a plurality of animated scenes, formed of a plurality of frames, on a display means, wherein said displayed animated scene switch program comprises:

a generation and storage step for generating image data of an animated scene one frame at a time and successively storing in accordance with a first frame buffering system the image data generated in ones of at least three data storage areas, used as frame buffers, of an image-data storage means which are each capable of storing the image data of one frame;

an output step for cyclically reading and successively outputting the image data stored in the at least three data storage areas on said display means in accordance with the first frame buffering system;

a switching-designation step for outputting a signal for designating switching of the animated scene displayed on said display means from an old animated scene produced using the at least three data storage areas and the first frame buffering system to a new animated scene;

a holding step for holding, when the switching-designation signal is output, image data of a last generated frame of the old animated scene presently being displayed on said display means in any one of the at least three data storage areas of said image-data storage means; and a switching-storage step for effecting:
using the image data of the last generated frame of the old animated scene with data for the new animated scene to successively generate image data for the new animated scene and cyclically storing the generated image data of the new animated scene in other ones of the at least three data storage areas than the any one of the at least three data storage areas storing the image data of the old scene in accordance with a second frame buffering system using one less frame buffer than said first frame buffering system; and cyclically reading and outputting the generated image data from the other ones of the at least three data storage areas onto said display means to produce the new animated scene on said display means in accordance with the second frame buffering system.

11. A video game machine comprising:

program storage means containing a game program;

operation means capable of being externally operated; and an image creating apparatus for selectively displaying a plurality of animated scenes, formed of a plurality of frames, on a display means, said image creating apparatus comprising:

image-data storage means including at least three data storage areas, used as frame buffers, in each of which image data of one frame on said display means are stored in accordance with a first frame buffering system;

picture-signal processing means for generating image data of one frame at a time and for successively storing the image data generated in ones of the at least three data storage areas in accordance with the first frame buffering system;

image output means for cyclically reading and successively outputting the image data stored in the at least three data storage areas on said display means in accordance with the first frame buffering system;

switching-designation means for outputting a signal for designating switching of the animated scene displayed on said display means from an old animated scene produced using the at least three data storage areas and the first frame buffering system to a new animated scene; and processing-control means for controlling switching the animated scene being displayed on said display means from the old animated scene to the new animated scene when the switching-designation signal is output, said processing-control means comprising:

an old-animated scene holding means for holding image data of a last generated frame of the old animated scene in any one of the at least three data storage areas in said image-data storage means; and an instruction-controlling means for controlling said picture-signal processing means to effect:
use of the image data of the last generated frame of the old animated scene with data of the new animated scene to successively generate image data for the new animated scene and to cyclically store the generated image data of the new animated scene in other ones of the at least three data storage areas than the any one of the at least three data storage areas storing the image data of the old scene in accordance with a second frame buffering system using one less frame buffer than said first frame buffering system; and use of the image output means to cyclically read and output the generated image data from the other ones of the at least three data storage areas onto said display means to produce the new animated scene on said display means in accordance with the second frame buffering system.

12. A video game machine according to claim 11, further comprising a game-clearing means for determining whether a predetermined clearing condition for the old animated scene has been satisfied by operating said operation means, wherein said switching-designation means outputs the switching-designation signal when the predetermined condition has been satisfied.

13. A video game machine according to any one of claims 11 and 12, further comprising:

operation-detecting means for detecting the contents of operation of said operation means; and command-creating means for creating, in accordance with the detected contents, in each predetermined period, rendering commands for generating the image data so as to correspond to each screen on said display means;

wherein said picture-signal processing means generates, based on each rendering command, image data; and said instruction-controlling mean uses the images of the old and new animated scenes to create the rendering commands for generating the image data by using said command-creating means.

* * * * *